US008908326B1

(12) United States Patent
Sorenson, III et al.

(10) Patent No.: US 8,908,326 B1
(45) Date of Patent: Dec. 9, 2014

(54) HARD DISK DRIVE MECHANICAL MODULES WITH COMMON CONTROLLER

(75) Inventors: James Christopher Sorenson, III, Seattle, WA (US); Colin L. Lazier, Seattle, WA (US); Kestutis Patiejunas, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 149 days.

(21) Appl. No.: 13/430,304

(22) Filed: Mar. 26, 2012

(51) Int. Cl.
*G11B 17/03* (2006.01)

(52) U.S. Cl.
USPC .............. 360/99.13; 360/99.14; 360/99.24

(58) Field of Classification Search
USPC .......... 360/97.13, 97.17, 97.24, 99.02, 99.06, 360/99.13, 99.14; 361/679.32, 679.34, 361/679.33, 679.31, 695, 727, 724; 414/800; 700/214, 217, 222, 228
See application file for complete search history.

(56) References Cited

U.S. PATENT DOCUMENTS

| | | | |
|---|---|---|---|
| 4,930,029 A | 5/1990 | Morita | |
| 5,025,336 A | 6/1991 | Morehouse et al. | |
| 5,282,099 A * | 1/1994 | Kawagoe et al. | 360/99.19 |
| 5,757,617 A * | 5/1998 | Sherry | 361/730 |
| 6,234,591 B1 | 5/2001 | Driscoll et al. | |
| 6,351,374 B1 * | 2/2002 | Sherry | 361/679.33 |
| 6,487,080 B2 * | 11/2002 | Robbins et al. | 361/727 |
| 6,519,110 B2 | 2/2003 | Dague et al. | |
| 7,057,981 B2 * | 6/2006 | Kano et al. | 369/30.28 |
| 7,200,008 B1 | 4/2007 | Bhugra | |
| 7,359,186 B2 | 4/2008 | Honda et al. | |
| 8,191,841 B2 | 6/2012 | Jeffery et al. | |
| 8,331,095 B2 | 12/2012 | Hu et al. | |
| 8,553,357 B1 * | 10/2013 | Sorenson et al. | 360/99.24 |
| 2004/0057203 A1 * | 3/2004 | Rabinovitz | 361/685 |
| 2005/0057898 A1 | 3/2005 | El-batal et al. | |
| 2005/0117462 A1 | 6/2005 | Kano et al. | |
| 2005/0157420 A1 * | 7/2005 | Hatanaka | 360/97.02 |
| 2005/0270681 A1 | 12/2005 | Suzuki et al. | |
| 2006/0087760 A1 * | 4/2006 | Forrer et al. | 360/60 |
| 2006/0187634 A1 | 8/2006 | Tanaka et al. | |
| 2006/0232891 A1 * | 10/2006 | Bushnik et al. | 360/265.6 |
| 2007/0053169 A1 | 3/2007 | Carlson et al. | |
| 2007/0091559 A1 * | 4/2007 | Malone | 361/685 |
| 2007/0233781 A1 | 10/2007 | Starr et al. | |
| 2008/0099235 A1 * | 5/2008 | Hiramoto et al. | 174/261 |
| 2009/0144568 A1 | 6/2009 | Fung | |
| 2011/0185099 A1 | 7/2011 | Stuhlsatz et al. | |
| 2011/0194242 A1 | 8/2011 | Hu et al. | |
| 2012/0243170 A1 * | 9/2012 | Frink et al. | 361/679.34 |

OTHER PUBLICATIONS

International Search Report and Written Opinion from PCT/US2012/029828, dated Jun. 13, 2012, Amazon Technologies, Inc., 14 pages.

(Continued)

*Primary Examiner* — Tan X Dinh

(74) *Attorney, Agent, or Firm* — Robert C. Kowert; Meyertons, Hood, Kivlin, Kowert & Goetzel, P.C.

(57) ABSTRACT

A system for storing data includes two or more drive mechanical modules configured to store data, one or more drive control modules coupled to the drive mechanical modules, and a data control module. The drive control modules control mechanical operations in the drive mechanical modules. The data control modules access data on the drive mechanical modules.

21 Claims, 17 Drawing Sheets

(56) References Cited

OTHER PUBLICATIONS

U.S. Appl. No. 13/069,065, filed Mar. 22, 2011, Darin Lee Frink et al.
U.S. Appl. No. 13/430,246, filed Mar. 26, 2012, James Christopher Sorenson, III et al.
U.S. Appl. No. 13/430,298, filed Mar. 26, 2012, James Christopher Sorenson, III et al.
U.S. Appl. No. 13/430,304, filed Mar. 26, 2012, James Christopher Sorenson, III et al.

* cited by examiner

HARD DISK DRIVE MECHANICAL MODULES WITH COMMON CONTROLLER

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Computer systems typically include a number of components that generate waste heat. Such components include printed circuit boards, mass storage devices, power supplies, and processors. For example, some computers with multiple processors may generate 250 watts of waste heat. Some known computer systems include a plurality of such larger, multiple-processor computers that are configured into rack-mounted components, and then are subsequently positioned within a rack system. Some known rack systems include 40 such rack-mounted components and such rack systems will therefore generate as much as 10 kilowatts of waste heat. Moreover, some known data centers include a plurality of such rack systems.

Some servers include a number of hard disk drives (for example, eight or more hard disk drives) to provide adequate data storage. Typically, the hard disk drives for servers are of a standard, off-the-shelf type. Standard, off-the-shelf hard disk drives are often a cost effective solution for storage needs because such hard disk drives can be obtained at relatively low cost. Nonetheless, in server designs using such standard hard disk drives, the arrangement of the hard disk drives may leave a substantial amount of wasted space in the server chassis. This wasted space, especially when multiplied over many servers in a rack, may result in inadequate computing or storage capacity for a system.

Hard disk drives include motors and electronic components that generate heat. Some or all of this heat must be removed from the hard disk drives to maintain continuous operation of a server. The amount of heat generated by the hard disk drives within a data room may be substantial, especially if all of the hard disk drives are fully powered up at all times. In some cases, heat generated by electrical components in a circuit board of a hard disk drive may be dissipated in mechanical components of the drive, thereby causing the mechanical components to operate at a higher temperature.

As with other components, hard disk drives fail from time to time while in service. These failures reduce the storage capacity of a system. To restore capacity, servers may need to be powered down and removed from a rack so that the defective hard disk drives can be replaced or repaired. Many hard disk drives failures may only involve electrical components (such as a semiconductor chip failure) or only mechanical components (such as an actuator failure). Nevertheless, repairing the data storage system may require removing and replacing both the mechanical components and the electrical components of the hard disk drive.

Figure 1:
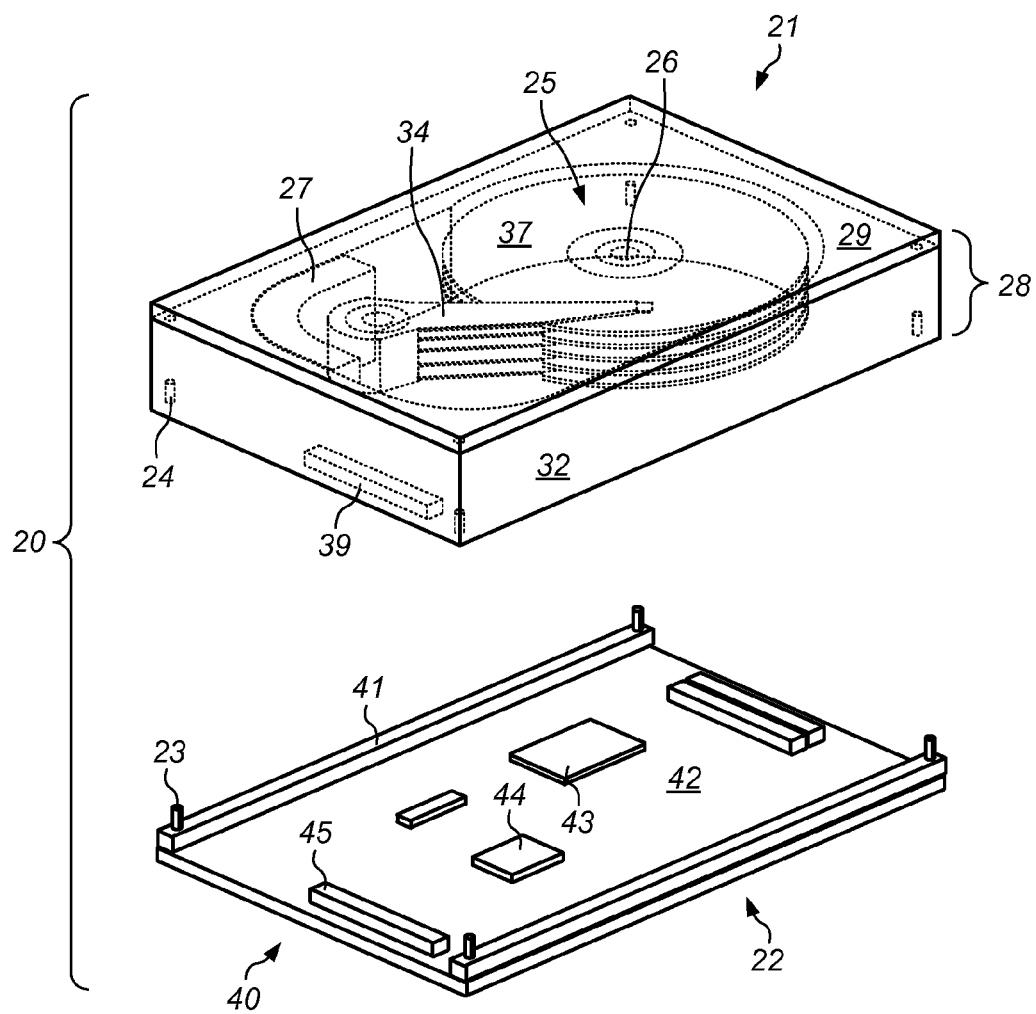
FIG. 1 illustrates one embodiment of a hard disk drive system with a mechanical module and a drive control module.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of computer systems, and systems and methods for performing computing operations, are disclosed. According to one embodiment, a system for storing data includes a rack, one or more data storage drive assemblies coupled to the rack, and a data control module coupled to the rack. The data storage drive assemblies include one or more drive mechanical modules configured to store data and one or more drive control modules coupled to the drive mechanical modules. The drive control modules control mechanical operations in the drive mechanical modules. The drive mechanical modules and the associated drive control modules are separable from one another without removing the other module from the at least one data storage drive assembly. The data control module accesses data on the drive mechanical modules.

According to one embodiment, a data storage drive assembly includes a drive mechanical module configured to store data and a drive control module coupled to the drive mechanical module. The drive control module control mechanical operations in the drive mechanical module. The data storage drive assembly can be mounted in a rack. The drive mechanical modules and the drive control module are separable from one another without removing the drive mechanical module or the drive control module from the rack.

According to one embodiment, a data storage system includes one or more hard disk drive systems and an air moving device. The hard disk drive systems may include one or more drive mechanical modules that store data and a drive control module electrically coupled to the drive mechanical modules. The drive control modules may control mechanical operations in the drive mechanical modules. The drive control module includes a circuit board assembly and heat producing components coupled to the circuit board assembly. Air passages on each side of the printed circuit board assembly allow a stream of air to flow across heat producing components on at least one side of the printed circuit board assembly. The air moving device moves air through the passages on the side of the printed circuit board assembly.

According to one embodiment, a hard disk drive assembly includes a drive mechanical module configured to store data and a drive control module coupled to the drive mechanical module. The drive control module includes a circuit board assembly and one or more heat producing components. The drive control modules controls mechanical operations in the drive mechanical module. Air passages between the drive mechanical module and the drive control module allow a stream of air to flow between the mechanical module and the drive control module.

According to one embodiment, a system for storing data includes two or more drive mechanical modules configured to store data, one or more drive control modules coupled to the drive mechanical modules, and a data control module. The drive control modules control mechanical operations in the drive mechanical modules. The data control modules access data on the drive mechanical modules. In certain embodiments, the drive control modules are oversubscribed such that, at any given time, each drive control module can only control mechanical operations on some of the mechanical modules to which it is connected. In certain embodiments, the data control modules is oversubscribed such that, at any given time, each data control module can only access data on some of the mechanical modules.

According to one embodiment, a method of maintaining a data storage system includes removing from the data storage system a mechanical module of a hard disk drive system without removing an associated drive control module that controls one or more mechanical operations in the mechanical module, or removing from the data storage system a drive control module without removing a mechanical module controlled by the drive control module. The removed mechanical module or the removed drive control module of the hard disk drive system is repaired or replaced.

According to one embodiment, a method of cooling a data storage system includes providing an air passage between mechanical components of a hard disk drive and a drive control circuit board that control mechanical operations of the hard disk drive. Cooling air is moved through the air passage to remove heat from heat producing components on the drive control circuit board.

According to one embodiment, a method of providing data storage includes coupling a drive control module to mechanical modules of two or more hard disk drive systems. Mechanical operations in the mechanical modules are controlled with the drive control module. In certain embodiments, the drive control module is oversubscribed such that the drive control module can only control some of the mechanical modules at any given time. The drive control module may switch control between the mechanical modules to selectively control different ones of the mechanical modules.

As used herein, "drive control module" means a module including one or more devices that can control one or more function of a drive.

As used herein, "drive mechanical control module" means any device that can control at least one mechanical operation on a drive. Examples of mechanical operations on a drive include controlling a motor, controlling the physical position of an actuator arm, and controlling the physical location of a read/write head.

As used herein, "drive mechanical module" means any element, device, or combination thereof that includes one or more mechanical components of a data storage drive. Examples of mechanical components of a drive include a spindle, a motor, and actuator, and a drive arm.

As used herein, a "mechanical" component, as related to a component of a hard disk drive, includes mechanical components, such as the arm of an actuator assembly, electromechanical components, such as a spindle motor or actuator, and any moving components of a hard disk drive, such as a platter.

As used herein, "air handling system" means a system that provides or moves air to, or removes air from, one or more systems or components.

As used herein, "air moving device" includes any device, element, system, or combination thereof that can move air. Examples of air moving devices include fans, blowers, and compressed air systems.

As used herein, "backplane" means a plate or board to which other electronic components, such as mass storage devices, circuit boards, can be mounted. In some embodiments, hard disk drives are plugged into a backplane in a generally perpendicular orientation relative to the face of the backplane. In some embodiments, a backplane includes and one or more power buses that can transmit power to components on the backplane, and one or more data buses that can transmit data to and from components installed on the backplane.

As used herein, a "cable" includes any cable, conduit, or line that carries one or more conductors and that is flexible over at least a portion of its length. A cable may include a connector portion, such as a plug, at one or more of its ends.

As used herein, "circuit board" means any board or plate that has one or more electrical conductors transmitting power, data, or signals from components on or coupled to the circuit board to other components on the board or to external components. In certain embodiments, a circuit board is an epoxy glass board with one or more conductive layers therein. A circuit board may, however, be made of any suitable combination of materials.

As used herein, "chassis" means a structure or element that supports another element or to which other elements can be mounted. A chassis may have any shape or construction, including a frame, a sheet, a plate, a box, a channel, or a combination thereof. In one embodiment, a chassis is made from one or more sheet metal parts. A chassis for a computer system may support circuit board assemblies, power supply units, data storage devices, fans, cables, and other components of the computer system.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to devices including a processor, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, testing, simulations, power distribution and control, and operational control.

As used herein, to "direct" air includes directing or channeling air, such as to a region or point in space. In various embodiments, air movement for directing air may be induced by creating a high pressure region, a low pressure region, or a combination both. For example, air may be directed downwardly within a chassis by creating a low pressure region at the bottom of the chassis. In some embodiments, air is directed using vanes, panels, plates, baffles, pipes or other structural elements.

As used herein, a "field replaceable unit" of a system means a unit that can be removed from the system while the system is in the field, such as at a data center or other location where the system is in operation.

As used herein, "member" includes a single element or a combination of two or more elements (for example, a member can include two or more sheet metal parts fastened to one another.

As used herein, a "module" is a component or a combination of components physically coupled to one another. A module may include functional elements and systems, such as computing devices, circuit boards, racks, blowers, ducts, and power distribution units, as well as structural elements, such a base, frame, housing, or container.

As used herein, "primarily horizontal" means more horizontal than vertical. In the context of an installed element or device, "primarily horizontal" includes an element or device whose installed width is greater than its installed height.

As used herein, "primarily vertical" means more vertical than horizontal. In the context of an installed element or device, "primarily vertical" includes an element or device whose installed height is greater than its installed width. In the context of a hard disk drive, "primarily vertical" includes a hard disk drive that is installed such that the installed height of the hard disk drive is greater than the installed width of the hard disk drive.

As used herein, a "rack" means a rack, container, frame, or other element or combination of elements that can contain or physically support one or more computer systems.

As used herein, "room" means a room or a space of a building. As used herein, "computer room" means a room of a building in which computer systems, such as rack-mounted servers, are operated.

As used herein, a "space" means a space, area or volume.

As used herein, "shelf" means any element or combination of elements on which an object can be rested. A shelf may include, for example, a plate, a sheet, a tray, a disc, a block, a grid, or a box. A shelf may be rectangular, square, round, or another shape. In some embodiments, a shelf may be one or more rails.

FIG. 1 illustrates one embodiment of a hard disk drive system with a mechanical module and a drive control module. Hard disk drive system 20 includes drive mechanical module 21 and drive control module 22. Drive mechanical module 21 may be coupled by installation of pins 23 of drive control module 22 in sockets 24 in drive mechanical module 21.

Figure 2:
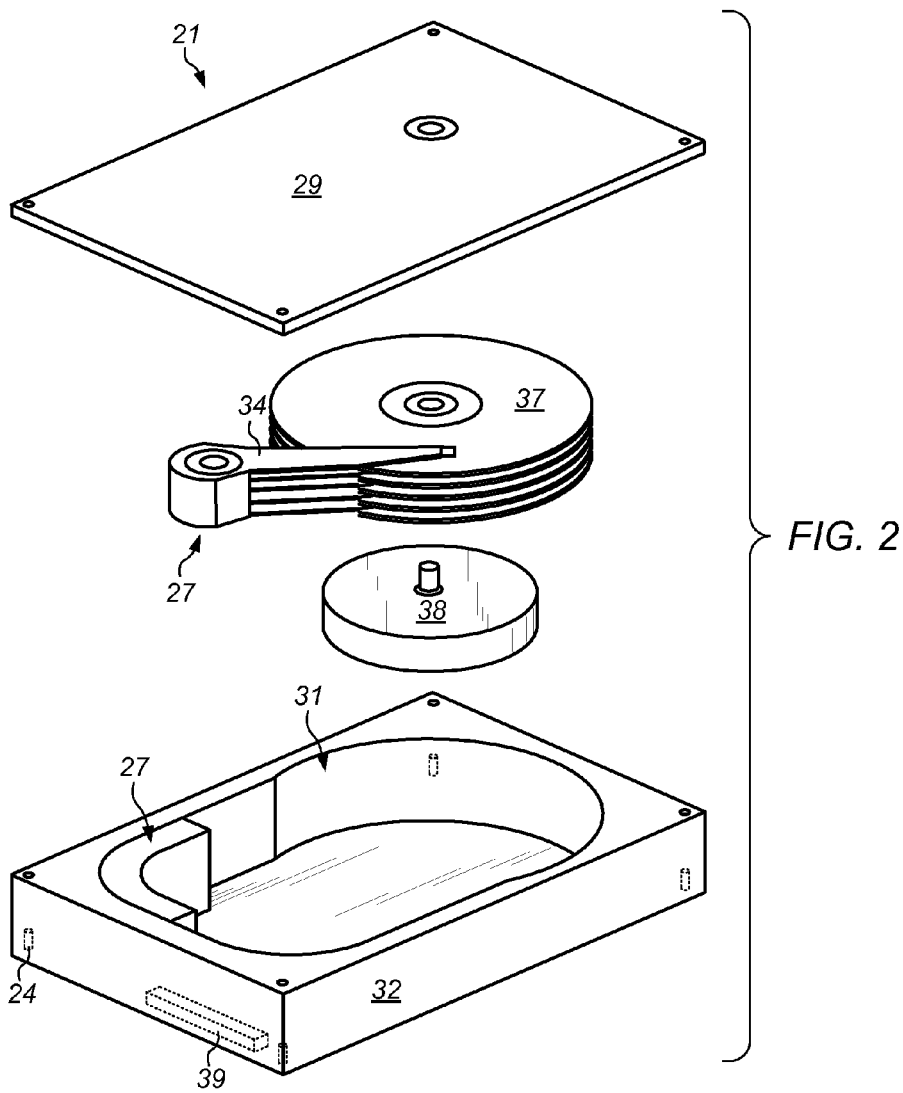
FIG. 2 is a partially exploded view illustrating one embodiment of a drive mechanical module.

FIG. 2 is an exploded view illustrating one embodiment of a drive mechanical module. Drive mechanical module 21 includes platter assembly 25, spindle 26, and actuator assembly 27. Platter assembly 25, spindle 26, and actuator assembly 27 are held in case 28. Cover 29 may be used to enclose platter assembly 25, spindle 26, and actuator assembly 27 in cavity 31 of case body 32. In some embodiments, case 28 is sealed or includes a filtered opening for inhibiting contamination within the case.

Read/write heads 33 are mounted on arms 34 of actuator assembly 27. Platter assembly 36 includes platters 37. Spindle motor 38 may be operated to turn spindle 26. In some embodiments, spindle motor 38 is a three-phase motor. Platters 37 may turn on spindle 26.

Actuator assembly 27 may be controlled to position read/write heads 33 relative to platters 37. In some embodiments, actuator assembly 27 includes a voice coil-type positioning mechanism. Read/write heads 33 may be used to read information from, and write data to, platters 37. Power, data, and control conductors for electrical components in drive mechanical module 22 may be terminated on electrical connector 37 (the power, data, and control wiring for the electrical components in drive mechanical module has been omitted from FIG. 2 for clarity.).

In various embodiments, additional components may be included in a mechanical module, including electronic components such as flash memory.

Figure 3:
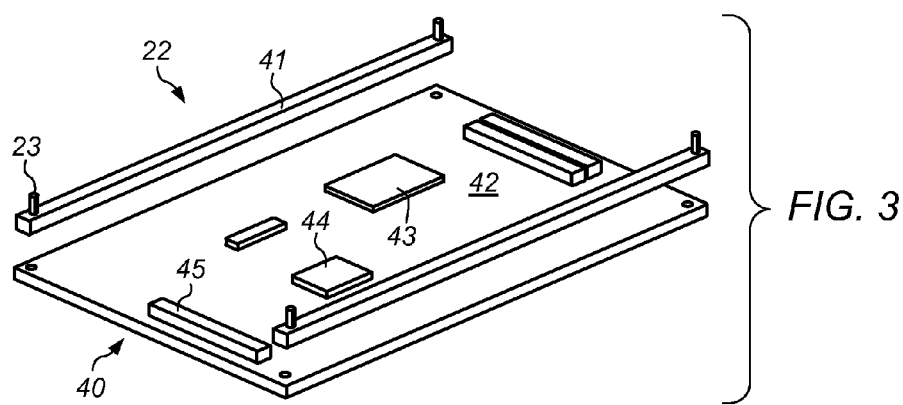
FIG. 3 is a partially exploded view illustrating one embodiment of a drive control module.

FIG. 3 is an exploded view illustrating one embodiment of a drive control module. Drive control module 22 includes circuit board assembly 40 and spacer rails 41. Spacer rails 41 may be attached to circuit board assembly 40 at the left and right sides of circuit board assembly 40. Spacer rails 41 may establish an air gap between circuit board assembly 40 of drive control module 22 and case 28 of drive mechanical module when drive control module 22 is attached to drive mechanical module 21.

Circuit board assembly 40 may include various components for controlling elements of hard disk drive system 20. Circuit board assembly 40 includes circuit board 42, processor 43, electronic components 44, and connector 45. Processor 43, electronic components 44, and electrical connector 45 may be mounted on circuit board 42. Electrical components 43 may include various components for operating hard disk drive system 20. In some embodiments, processor 42 is a programmable logic controller.

Drive control module 22 may control operation of hard disk drive system 20. In some embodiments, drive control module 22 controls mechanical operations on drive mechanical module. Examples of mechanical operations that may be controlled by a drive control module 22 include driving spindle motor 37 and controlling the position of arms 34 of actuator assembly 35.

In the embodiment shown in FIG. 1, the drive mechanical module and the drive control module may be physically coupled to one another by way of a pin and socket connection. A physical connection between a drive mechanical module and the drive control module may, however, be accomplished using other arrangements and components, such as machine screws, clips, hooks, or cam fasteners. In some embodiments, a drive mechanical module and a corresponding drive control module may be physically separate from another when installed (for example, in adjacent slots on a mounting tray or backplane).

In some embodiments, electrical connector 37 of drive mechanical module 21 and electrical connector 45 of drive control module 22 automatically couple when the mechanical module and a drive control module are physically coupled to one another. In one embodiment, electrical connector 39 of drive mechanical module 21 and electrical connector 45 of drive control module 22 are blind-mate connectors. In some embodiments, electrical connections between a mechanical module and a drive control module may be made by other conductors and connecting elements, such as a ribbon cable.

In various embodiments, a drive control module may control operations on a mechanical module of a hard disk drive system. As examples, a drive control module may control mechanical operations, data access, power management, and control operations.

Figure 4:
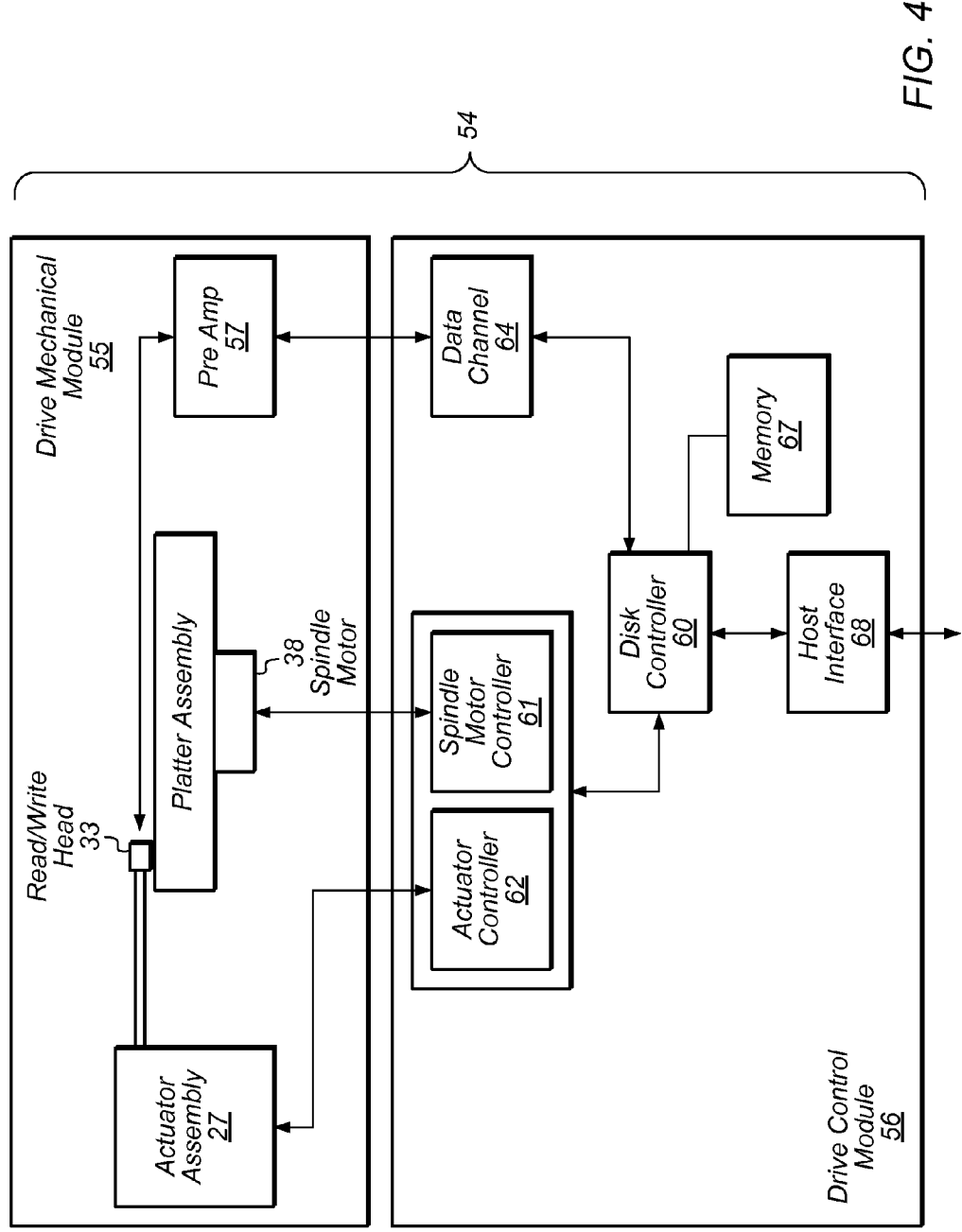
FIG. 4 is a block diagram illustrating one embodiment of a system including a hard disk drive system with a mechanical module and a drive control module.

FIG. 4 is a block diagram illustrating one embodiment of a system including a hard disk drive system with a mechanical module and a drive control module. Hard disk drive system 54 includes drive mechanical module 55 and drive control module 56. In some embodiments, drive mechanical module 55 and drive control module 56 are physically separable from one another, such as in the manner of drive mechanical module 21 and drive control module 22 described above relative to FIGS. 1-3.

Drive mechanical module 55 includes platter assembly 25, actuator assembly 27, read/write heads 33, spindle motor 38, and preamplifier 57. Preamplifier 57 may amplify signals from read/write heads 33. Preamplifier 57 may include a separate channel for each of read/write heads 33 in drive mechanical module 55.

Drive control module 56 may control operation of hard disk drive system 54, such as storing and retrieving data on platters in drive mechanical module 55. Drive control module 56 includes disk controller 60, spindle motor controller 61, and actuator controller 62. Disk controller 60 may perform various functions, including managing transfer of data to and from the host via the host interface, buffer management, caching, and error correction. In certain embodiments, spindle motor control, actuator control, or both, are controlled by disk controller 60.

Spindle motor controller 61 may control operation of spindle motor 38 in drive mechanical module 55. For example, spindle motor controller 61 may control rotation speed, rotation stability, acceleration, and mode of operation for spindle motor 38.

Actuator controller 62 may control operation of actuator assembly 27 in drive mechanical module 55. For example, actuator controller 62 may control positions of the arms of actuator assembly 27.

Drive control module includes data channel 64. Data channel 64 is coupled to preamplifier 57 of drive mechanical module 55. Data channel 64 may encode data and perform data transfer to and from platters in drive mechanical module 55. In one embodiment, data channel 64 is a read channel.

Disk controller 66 may control data access of data on platter assembly 25. Disk controller 66 may access memory. In some embodiments, memory 67 includes buffer RAM. Disk controller 60 may exchange data over host interface 68.

Figure 5:
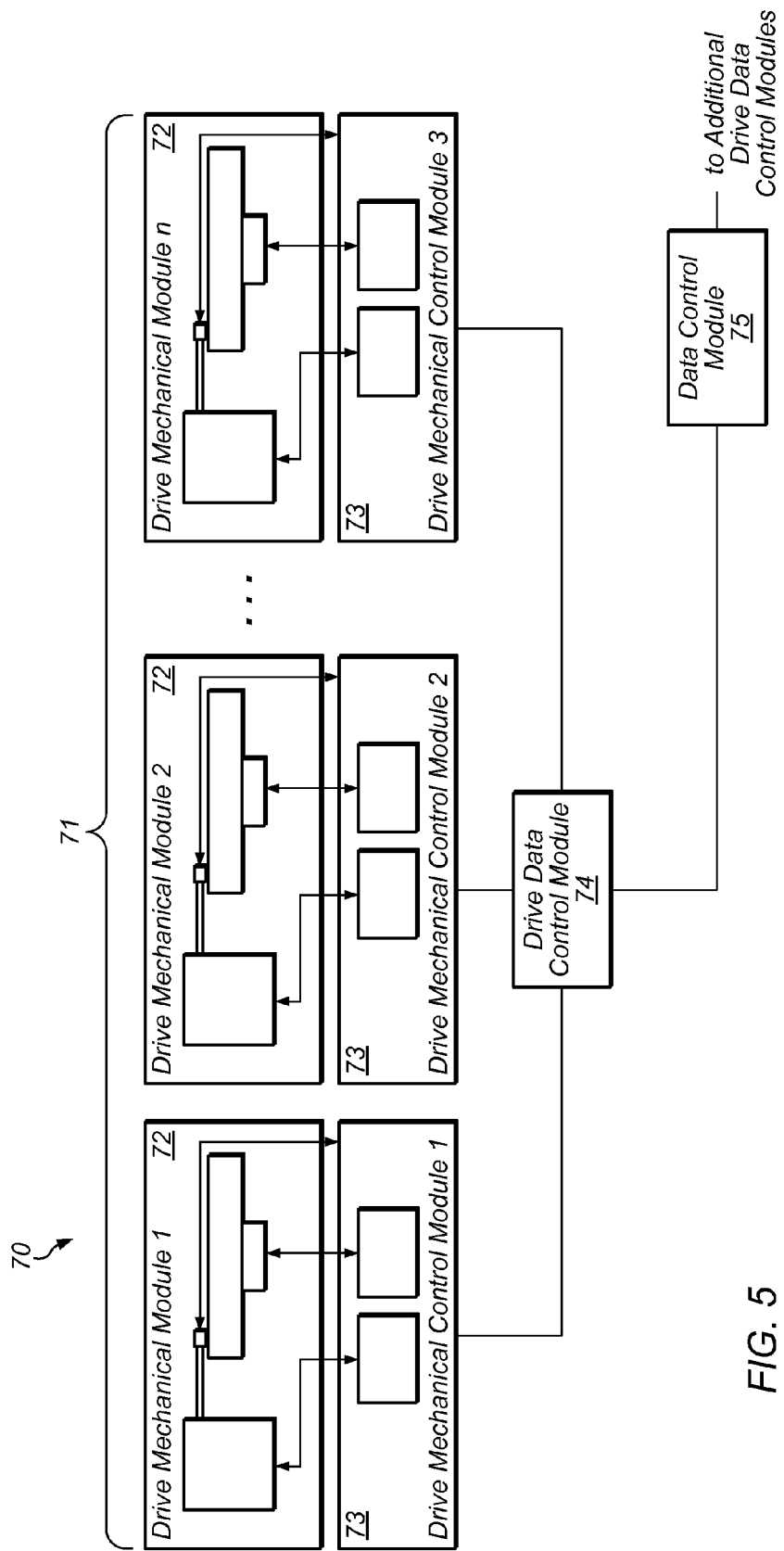
FIG. 5 illustrates one embodiment of a data storage system including mechanical modules with a common drive data control module.

In some embodiments, control of two or more hard disk drive assemblies is performed by a common controller. FIG. 5 illustrates one embodiment of a data storage system including mechanical modules with a common drive data control module. Data storage system 70 includes hard disk drive assemblies 71. Each of hard disk drive assemblies 71 includes drive mechanical module 72 and drive mechanical control module 73. Drive mechanical module 72 and drive mechanical control module 73 may be separable from one another, such as in the manner of drive mechanical module 21 and drive control module 22 described above relative to FIGS. 1-3. Each of drive mechanical control modules 73 may control one or more mechanical operations on a corresponding one of drive mechanical modules, such as spindle motor speed.

Each of hard disk drive assemblies 71 is coupled to drive data control module 74. Drive data control module 74 may commonly control data transfer operations, mechanical operations, or both, on drive mechanical modules 72. In some embodiments, drive data control module 74 selectively controls hard disk drive assemblies 71 one at a time. In some embodiments, drive data control module 74 simultaneously controls two or more of hard disk drive assemblies 71. Drive data control module 74 is coupled to data control module 75. Data control module 75 may control drive data control module 74 and additional data storage systems.

Figure 6:
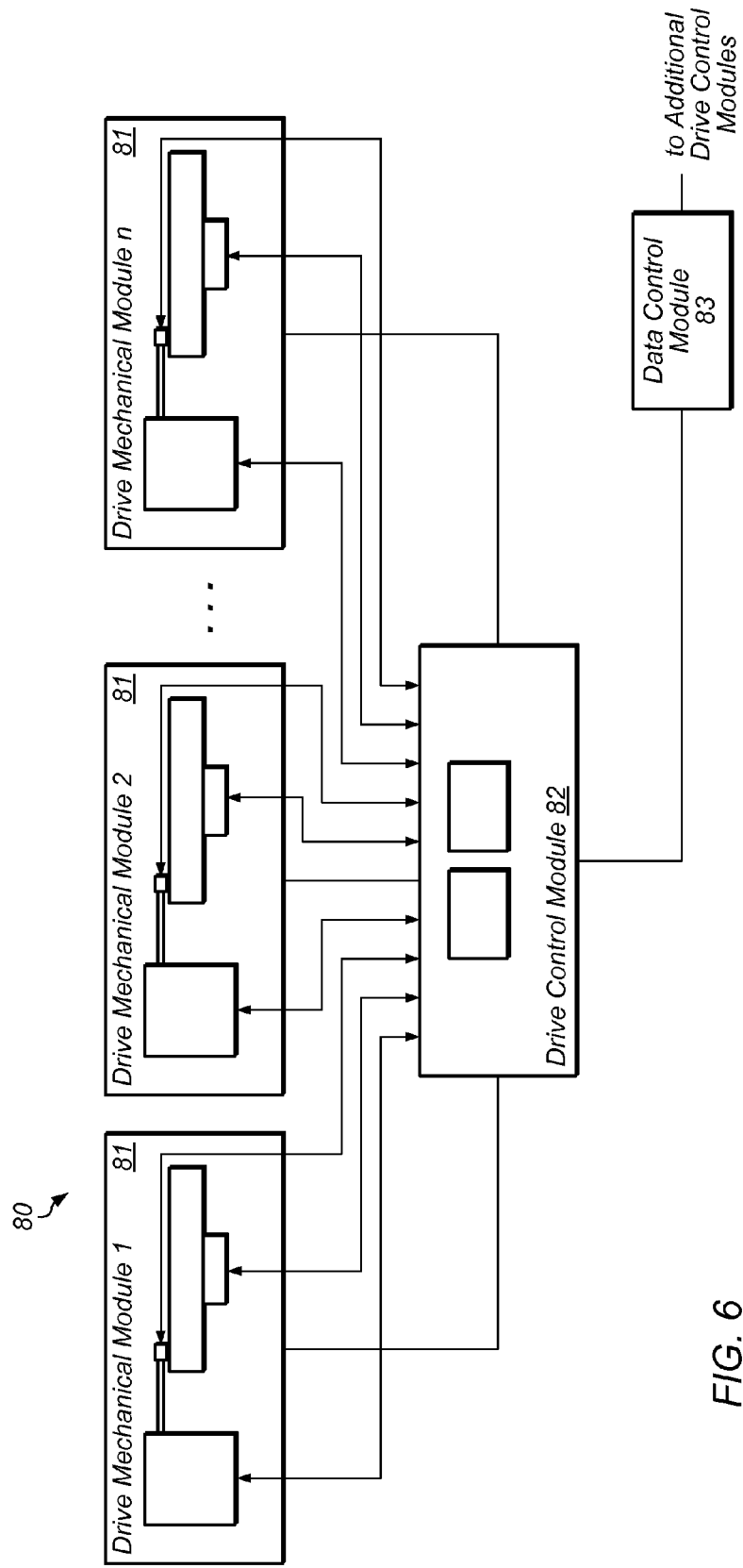
FIG. 6 illustrates one embodiment of a data storage system including a drive control module that controls mechanical operations on multiple drive mechanical modules.

In some embodiments, control of mechanical operations in two or more hard disk drive assemblies is performed by a common drive controller. FIG. 6 illustrates one embodiment of a data storage system including a drive control module that controls mechanical operations on multiple drive mechanical modules. Data storage system 80 includes drive mechanical modules 81. Drive mechanical modules 81 are commonly coupled to drive control module 82. Drive control module 82 may control data transfer operations and mechanical operations on drive mechanical modules 81.

In some embodiments, drive control module 82 selectively controls drive mechanical modules 81 one at a time. In some embodiments, drive control module 82 simultaneously controls two or more of drive mechanical modules 81. Drive data control module 84 is coupled to data control module 83. Data control module 83 may control drive control module 82 and additional data storage systems.

Drive control module 82 may include logic circuits for switching mechanical control and data access among drive mechanical modules 81. In some embodiments, only a subset of drive mechanical modules 81 is active at any given time. In one embodiment, drive mechanical modules 81 are selectively activated one at a time by drive control module 82. In certain embodiments, each of the drive mechanical modules has a unique address that is used by drive control module 82 to access drive mechanical modules over a bus. In some embodiments, a switching device is included between a drive control module and one or more drive mechanical modules. For example, a switch unit may be provided between drive mechanical modules 81 and drive control module 82.

In some embodiments, one or more of the drive mechanical modules are field replaceable units. In some embodiments, a drive control module that controls mechanical operations is a field replaceable unit. In some embodiments, a drive mechanical module and drive control module for a hard disk drive assembly are separable from one another such that one or both of the modules can be removed from a data storage assembly or a rack without removing the other module. A separable drive mechanical module and drive control module may allow for one of the modules to be removed and replaced without removing the other module. For example, a drive control module that has a failed circuit board may be removed and replaced without removing a mechanical module controlled by the drive control module (for example, drive platters, spindle motor, and voice coil).

Figure 7:
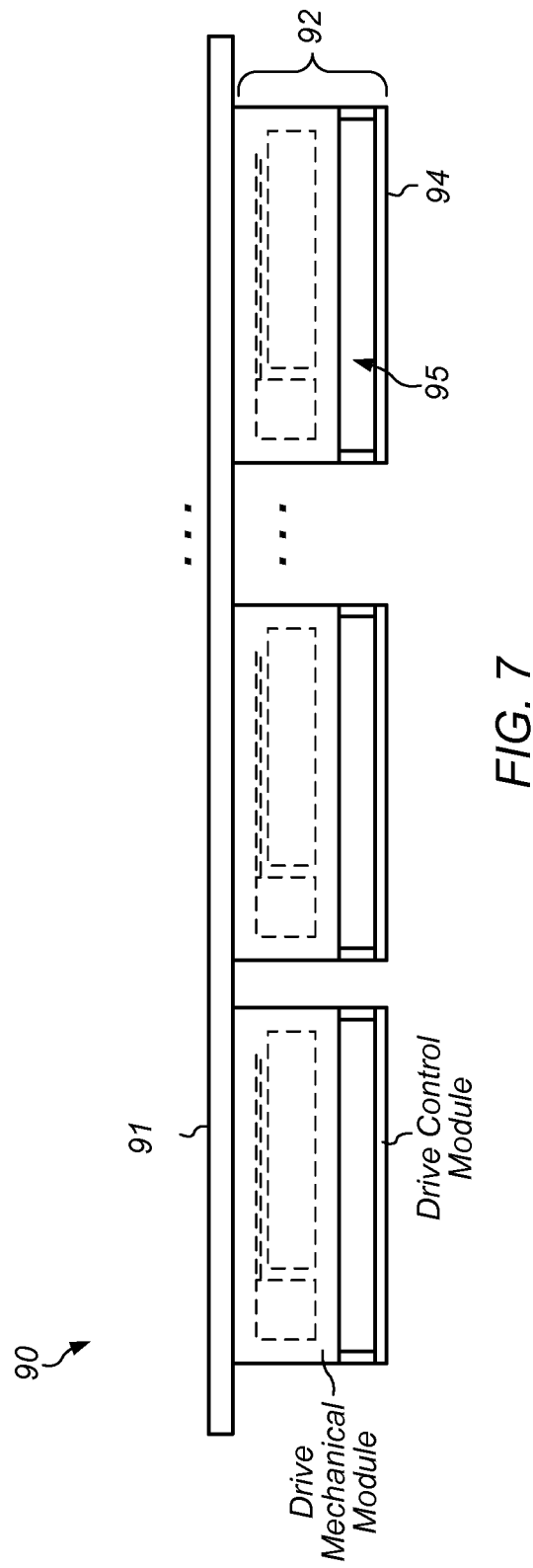
FIG. 7 illustrates a data storage system having hard disk drives with separable mechanical modules and drive control modules horizontally mounted on a chassis.

FIG. 7 illustrates a data storage system having hard disk drives with separable mechanical modules and drive control modules horizontally mounted on a chassis. Data storage system 90 includes chassis 91 and hard disk drive assemblies 92. Each of hard disk drive assemblies 92 includes mechanical module 93 and drive control module 94. Hard disk drive assemblies 92 are mounted on chassis 91. Mechanical module 93 and drive control module 94 may be similar to mechanical module 21 and drive control module 22 described above relative to FIGS. 1-3.

Drive control module 94 may be separable from mechanical module 93 while mechanical module 93 remains installed on chassis 91. In some embodiments, drive control module 94 is secured to mechanical module 93 without separate fasteners (for example, without machine screws). For example, drive control module 94 may be secured to mechanical module 93 by a pin and socket connection as described above relative to FIGS. 1-3.

Spacer rails 41 of mechanical module 93 establish an air gap 95 between each drive control module 94 and the corresponding mechanical module 93. Air gap 95 may serve as an air passage for passing cooling air between drive control module 94 and mechanical module 93 to remove heat from heat-producing components in drive control module 94.

Although in the embodiment shown in FIG. 7, mechanical module 93 is nearer to chassis 91 than drive control module 94, in other embodiments, the arrangement may be reversed such that the drive control module is nearer to a chassis or mounting tray. In such case, the mechanical module may be removable from the assembly without removing the drive control module.

Figure 8:
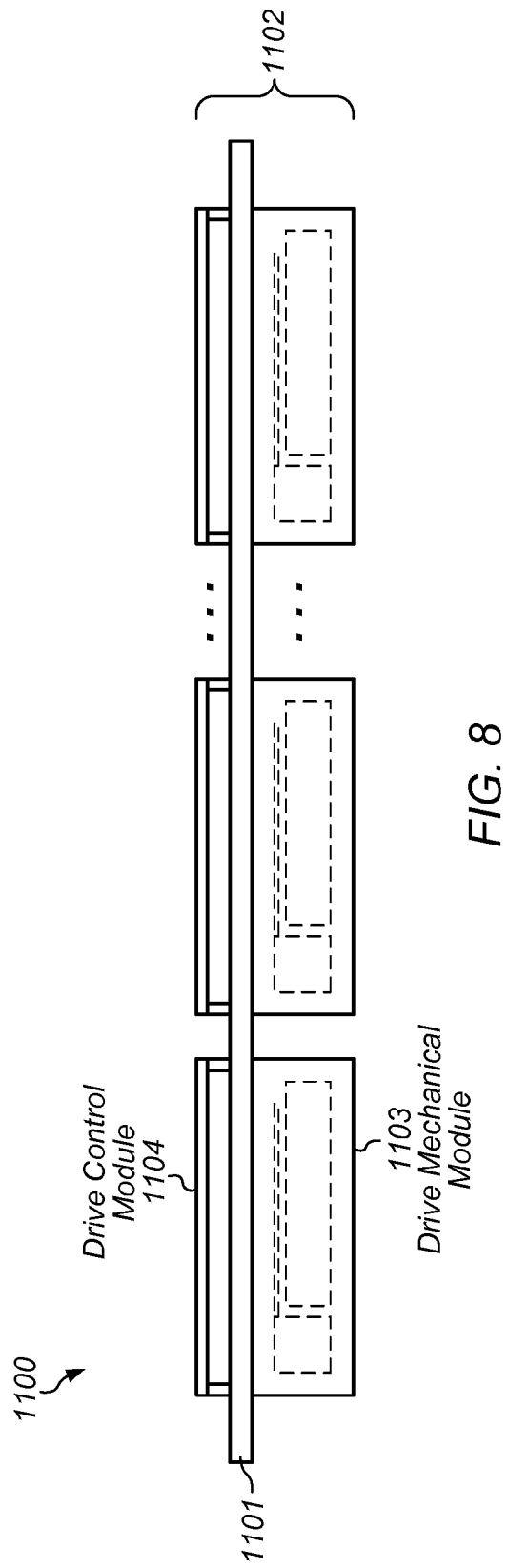
FIG. 8 illustrates a data storage system having hard disk drives with separable mechanical modules and drive control modules horizontally mounted on opposite sides of a chassis.

FIG. 8 illustrates a data storage system having hard disk drives with separable mechanical modules and drive control modules horizontally mounted on opposite sides of a common chassis. Data storage system 1100 includes chassis 1101 and hard disk drive assemblies 1102. Each of hard disk drive assemblies 1102 includes mechanical module 1103 and drive control module 1104. For each hard disk drive assembly 1102, mechanical module 1103 and drive control module 1104 are mounted on opposing sides of chassis 1101. Mechanical module 1103 and drive control module 1104 may be similar to mechanical module 21 and drive control module 22 described above relative to FIGS. 1-3.

Mechanical module 1103 and drive control module 1104 may be electrically connected by way of a cable or blind mount connector. In some embodiments, a blind-mate connection or cable passes through an opening in chassis 1101.

Mechanical module 1103 and drive control module 1104 may each be separable from chassis one another and from chassis 1101 while the other module of the drive assembly remains installed on chassis 1101.

In some embodiments, mechanical module 1103 and drive control module 1104 are secured to one another, chassis 1101, or both, without separate fasteners such as machine screws (for example, by way of a pin and socket connection as described above relative to FIGS. 1-3.)

Figure 9:
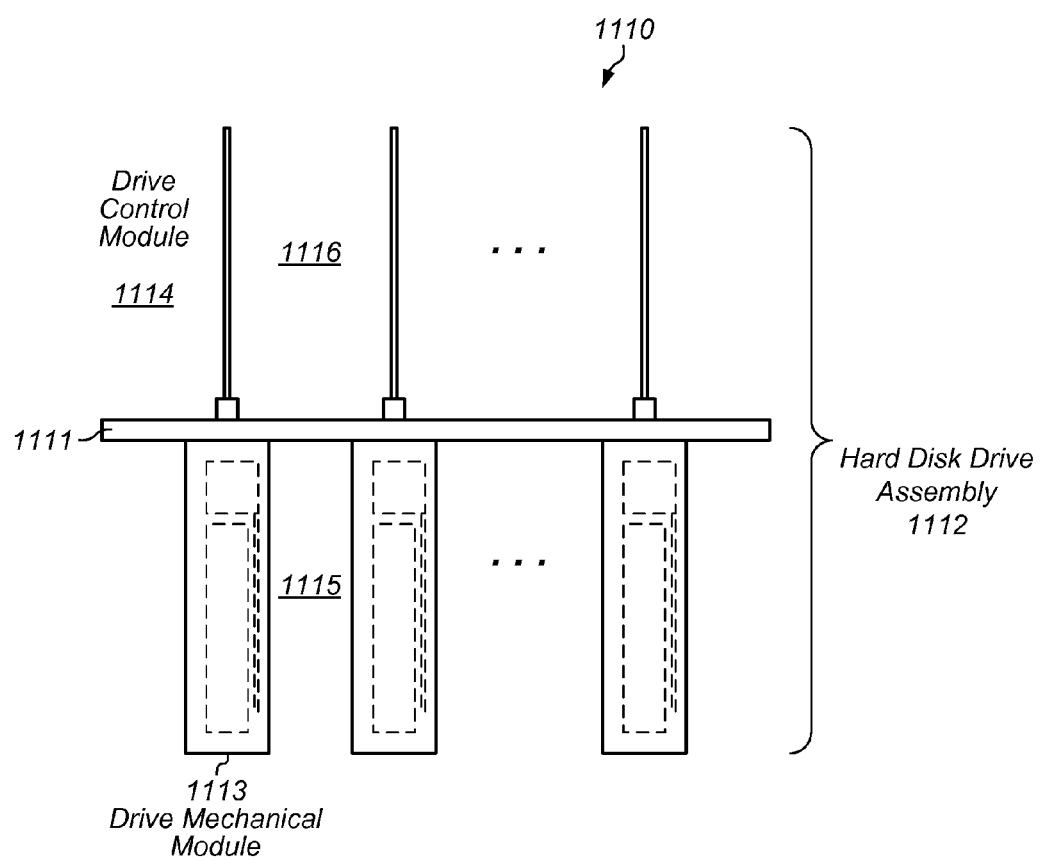
FIG. 9 illustrates a data storage system having hard disk drives with separable mechanical modules and drive control modules vertically mounted on opposite sides of a chassis.

FIG. 9 illustrates a data storage system having hard disk drives with separable mechanical modules and drive control modules vertically mounted on opposing sides of a common chassis. Data storage system 1110 includes chassis 1111 and hard disk drive assemblies 1112. Each of hard disk drive assemblies 1112 includes mechanical module 1113 and drive control module 1114. For each hard disk drive assembly 1112, mechanical module 1113 and drive control module 1114 are mounted on opposing sides of chassis 1111. Mechanical module 1113 and drive control module 1114 may be similar to mechanical module 21 and drive control module 22 described above relative to FIGS. 1-3.

Mechanical module 1113 and drive control module 1114 may be electrically connected by way of a cable or blind mount connector. In some embodiments, a blind-mate connection or cable passes through an opening in chassis 1112. In certain embodiments, chassis 1112 includes a circuit board assembly with edge mount connectors for receiving drive control modules 1114.

Mechanical module 1113 and drive control module 1114 may each be separable from chassis one another and from chassis 1111 while the other module of the hard disk drive assembly remains installed on chassis 1111.

Gaps 1115 between adjacent mechanical modules 1113 may serve as air passages for moving cooling air across the sides of mechanical modules 1113. Gaps 1116 between adjacent drive control modules 1114 may serve as air passages for moving cooling air across the sides of drive control modules 1114. In some embodiments, air flow is controlled such that air flow characteristics above and below chassis 1111 controlled to enhance cooling effectiveness. For example, in one embodiment, air flow is regulated to increase airflow over drive control modules 1114 to enhance cooling of the drive control modules.

In some embodiments, mechanical module 1113 and drive control module 1114 are secured to one another, chassis 1112, or both, without separate fasteners such as machine screws (for example, by a pin and socket connection as described above relative to FIGS. 1-3.)

Figure 10:
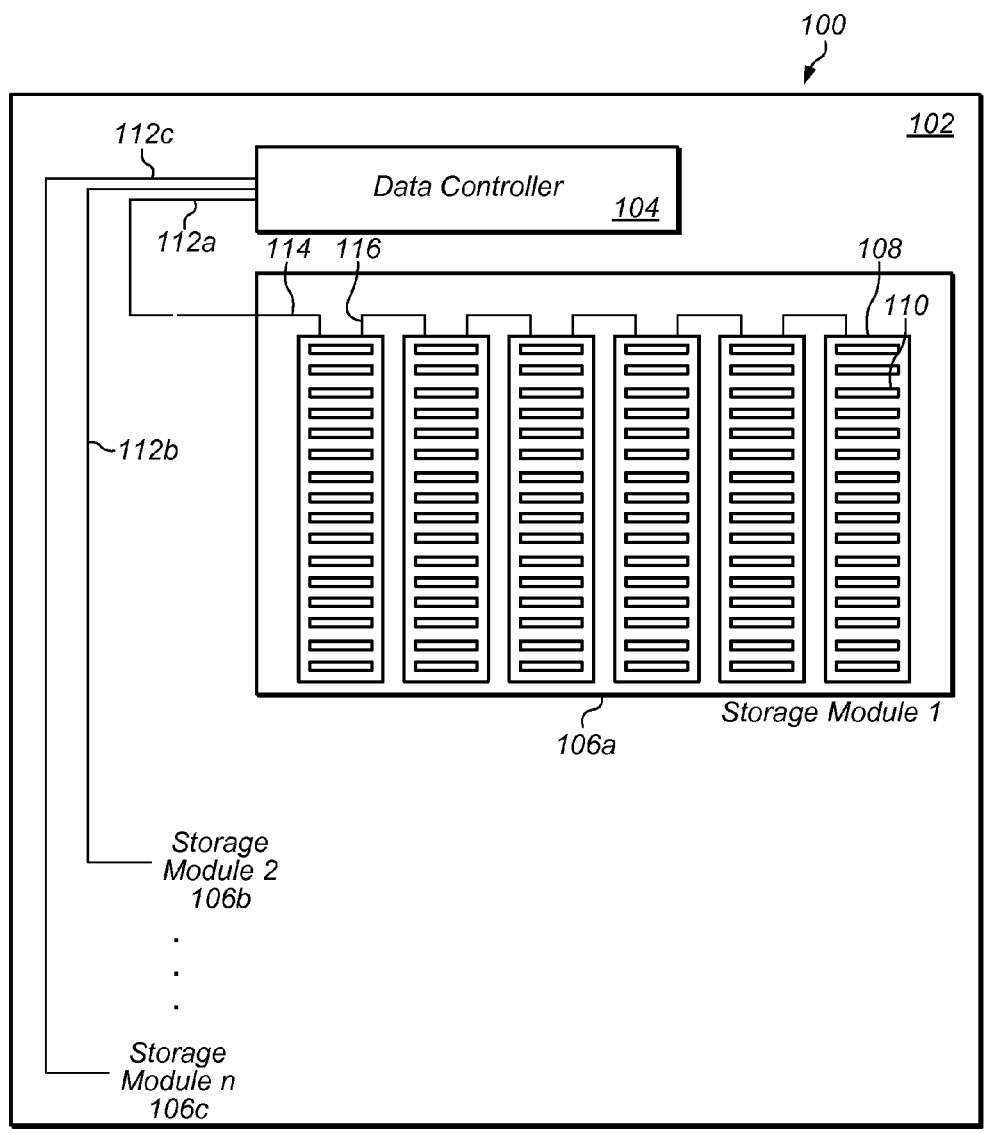
FIG. 10 is a block diagram illustrating one embodiment of a system including a data control module and data storage modules in a rack.

In various embodiments, a data storage system includes one or more data storage modules that are accessed from, and controlled by, a data controller external to the data storage modules. In some embodiments, a data control module and one or more data storage modules coupled to the data control module are included within a rack. FIG. 10 is a block diagram illustrating one embodiment of a system including a data control module and data storage modules in a rack. System 100 includes rack 102, data control module 104, data storage modules 106. Data control module 104 and data storage modules 106 are included in rack 102.

Mass storage devices in data storage modules 106 are coupled to data control module 104. Data control module 104 may access data on any or all of the mass storage devices in data storage modules 106a, 106b, and 106c.

In various embodiments, a data storage module includes two or more circuit boards, each of which carry, and provide electrical connections for, multiple mass storage devices. For example, in the embodiment illustrated in FIG. 10, data storage module 106 includes backplane circuit boards 108. Backplanes circuit boards 108 carry mass storage devices 110. Backplane circuit boards 108 may provide power, data, and signal connections for mass storage devices 110. In various embodiments, each of mass storage devices 110 is a hard disk drive. In one embodiment, each of mass storage devices 110 is a 500 GB hard disk drive with a SATA 3 Gb/s interface.

In the embodiment shown in FIG. 10, each backplane circuit board 108 carries 16 mass storage devices 110. A backplane may, however, carry any number of mass storage devices. In some embodiments, different backplanes within a data storage module carry a different number of mass storage devices.

System 100 includes bus 112a, 112b, and 112c. Bus 112a couples data control module 104 with data storage module 106a. Bus 112b couples data control module 104 with data storage module 106b. Bus 112c couples data control module 104 with data storage module 106c. Buses 112a, 112b, and 112c may each include one or more cables between data control module 104 and data storage modules 106a, 106b, and 106c. Each of buses 112a, 112b, and 112c may provide a connection for data input/output between data controller 104 and one of the data storage modules. In some embodiments, each of buses 112a, 112b, and 112c may provide for data I/O on multiple channels (for example, four channels). Each of data storage modules 106a, 106b, and 106c may be assigned a separate identifier.

In various embodiments, data access and transfer between a data controller and data storage modules in a system may be carried out by way of any suitable computer bus. In some embodiments, data access and transfer is carried out by way of a Serial attached SCSI (SAS) bus. In some embodiments, data access and transfer is carried out by way of a Serial Advance Technology Attachment (SATA) bus.

Connections within each of storage modules 106a, 106b, and 106c may include chaining backplanes within a data storage module. For example, as illustrated in FIG. 10, the left-most backplane is coupled to bus 112a by way of input 114 on backplane circuit board 108. Output 116 on the left-most backplane is coupled to input 114 on the adjacent backplane. Each additional backplane circuit board 108 may be chained to another backplane circuit board in a similar manner, such as is illustrated in FIG. 1.

In some embodiments, each of backplanes 108 includes an expander chip. The expander chip may enable communication with the various mass storage devices 110. Each of backplanes 108 may also include a cascading port for chaining backplanes 108 one to another. In some embodiments, backplanes 108 includes circuitry for conditioning power to mass storage devices 110. In certain embodiments, backplanes 108 may each include a power supply for mass storage devices 110 on the backplane.

For the sake of clarity, the backplanes and mass storage devices are shown only for data storage module 106a. The backplanes and mass storage devices for data storage modules 112b and 112c may be similar to those of data storage module 112a.

Each backplane may include an output for each of the installed mass storage devices 110. In one embodiment, the data input/output interface to backplanes includes four channels. In one embodiment, each of mass storage devices 110 has a 500 GB storage capacity.

Although 3 modules are shown in FIG. 10, in various embodiments any number of data storage modules may be coupled to a data controller.

Figure 11:
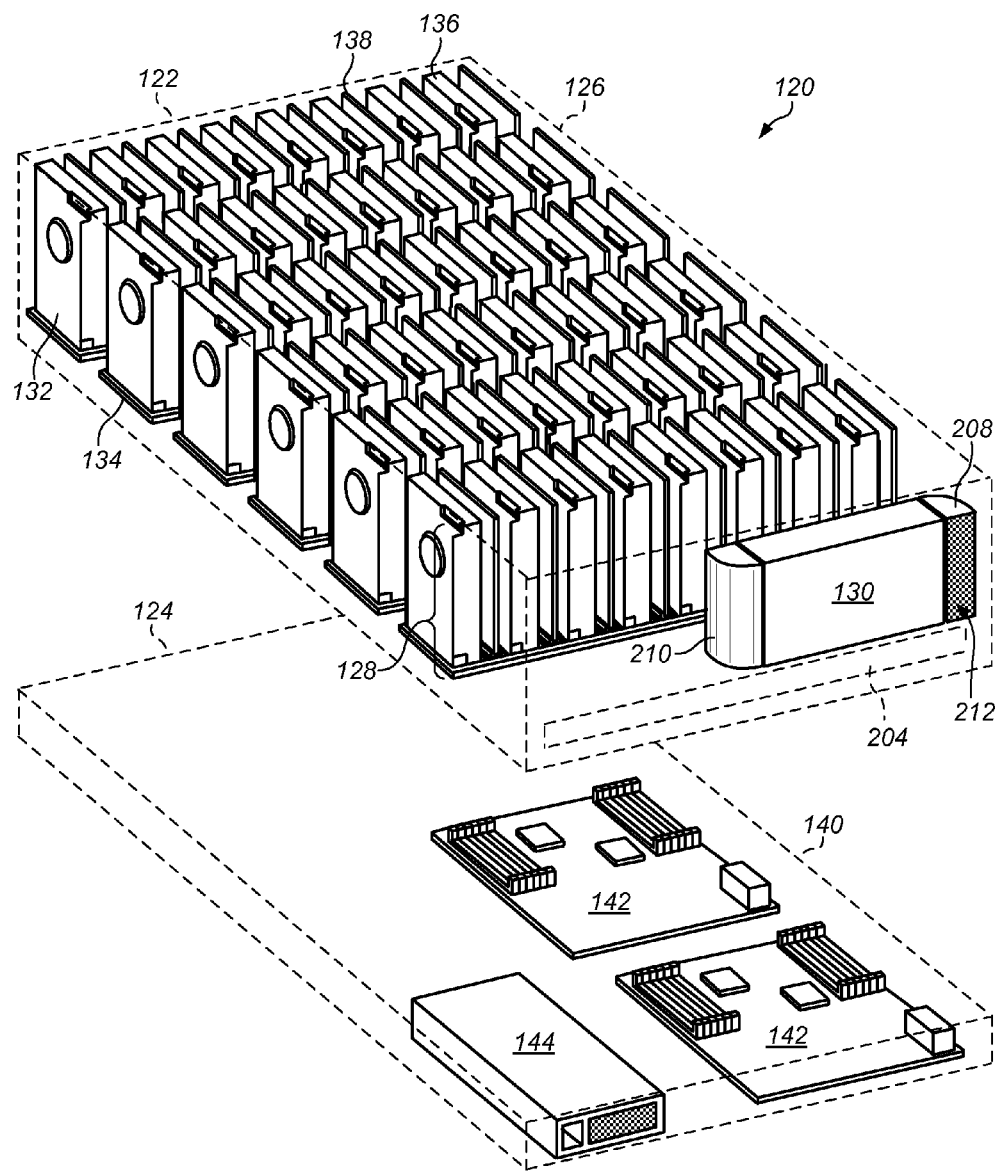
FIG. 11 illustrates one embodiment of a system including a data control module and data storage module having mass storage devices installed on multiple backplanes.

FIG. 11 illustrates one embodiment of a system including a data control module and data storage module having mass storage devices installed on multiple backplanes. System 120 includes data storage module 122 and data control module 124. In some embodiments, data storage module 122 and data control module 124 are mounted in a rack.

Data storage module 122 includes data storage module chassis 126, data storage assemblies 128, power supply unit 130. Data storage assemblies 128 include backplane circuit board assemblies 132 and hard disk drive systems 134. Each of hard disk drive systems 134 includes mechanical module 136 and drive control module 138.

Backplane circuit board assemblies 132 may be mounted horizontally in data storage module chassis 126. Mechanical modules 136 and drive control modules 138 of hard disk drive systems 134 are installed on backplane circuit board assemblies 132. Mechanical modules 136 and drive control modules 138 may be installed in a vertical orientation. In some embodiments, mechanical modules 136 are installed such that the installed height is the largest dimension of the mechanical module.

For each of hard disk drive systems 134, mechanical module 136 may be electrically coupled to a corresponding drive control module 138. In some embodiments, drive control module 138 includes a circuit board assembly. The circuit board assembly may include circuits for controlling mechanical components, such as spindle motors and actuators, of mechanical module 136. In some embodiments, each mechanical module 136 is electrically coupled to a corresponding drive control module 138 by way of a cable, such as a ribbon cable. In some embodiments, each mechanical module 136 is electrically coupled to a corresponding drive control module 138 by way of conductors in the backplane circuit board assembly 132 holding the modules.

Power supply unit 130 may be coupled to backplane circuit board assemblies 132. Power supply unit 130 may supply power to backplane circuit board assemblies 132 and hard disk drive systems 134.

Data control module 124 includes data control module chassis 140, control circuit board assemblies 142, and power supply unit 144. Control circuit board assemblies 142 and power supply unit 144 may be mounted on data control module chassis 140. Control circuit board assemblies 142 may access data on hard disk drive systems 134.

Power supply unit 144 may be coupled to control circuit board assemblies 142. Power supply unit 144 may supply power to control circuit board assemblies 142.

In one embodiment, data storage module 122 is about 4 U in height and data control module 124 is about 1 U in height.

In FIG. 11, data storage module chassis 126 and data control module chassis 140 are represented with a simple box outlines for the sake of clarity. In various embodiments, a chassis for a module may include, or be used in combination with, various structural elements and components for support, mounting, and environmental protection of the elements of the module, such as enclosures, mounting plates, covers, panels, or mounting rails.

In various embodiments, a computing unit includes a power supply that conforms to an industry-recognized standard. In some embodiments, a power supply for a computing unit has a form factor in accordance with an industry-recognized standard.

In one embodiment, power supply units 130 and 144 have a standard 1 U form factor. Examples of other standards for a power supply and/or a power supply form factor include 2 U, 3 U, SFX, ATX, NLX, LPX, or WTX.

In the embodiment shown in FIG. 11, data storage module 122 and data control module 124 each include one power supply unit and data storage module data storage module 122 includes 48 hard disk drive systems. A computing system may, however, have any number of hard disk drives, power supply units, or other components. In certain embodiments, a data storage module or data control module may have one or more internal fans to promote the flow of air through a computer system. For example, in certain embodiments, a row of fans may be provided along the rear edge of data storage module 124. In certain embodiments, a computing system may have no fans and/or no disk drives. In certain embodiments, a power supply may be external to the storage or computing module. For example, in certain embodiments, control circuit board assemblies 142 of data control module 124 may receive power from a power supply external to data control module chassis 140 (such as a rack-level power supply), and power supply unit 144 may be omitted.

Figure 12:
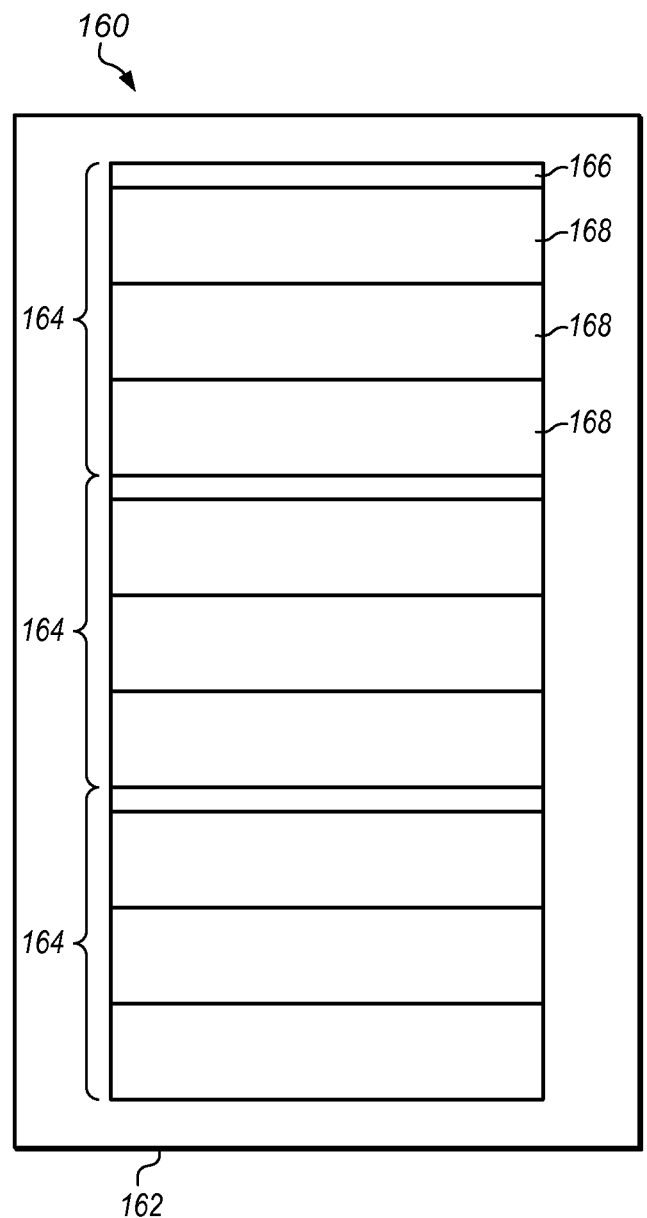
FIG. 12 is a schematic diagram illustrating a front view of three data storage subsystems in a rack.

In some embodiments, a rack includes two or more data storage subsystems having vertically oriented hard disk drive systems. FIG. 12 is a schematic diagram illustrating a front view of three data storage subsystems in a rack. System 160 includes rack 162 and data storage sub-systems 164. Data storage subsystems 164 each include data control module 166 and three data storage modules 168. In each of data storage subsystems 164, data control module 166 may control, and access data on, data storage modules 168.

In some embodiments, data storage modules 166 include two or more horizontally mounted backplanes carrying vertically oriented drive mechanical modules and drive control modules. For example, data storage modules 168 may each include 6 backplanes and drive mechanical modules and drive control modules arranged as described above for data storage module 122.

In one embodiment, each of data storage modules 168 is 4 U in height and each data control module 166 is 1 U in height, for a total of 13 U of height for each sub-system, and a total of 39 U used for the rack. Nevertheless, in various embodiments, data storage modules and data control modules may be any suitable height.

Although in the embodiment shown in FIG. 12, the data controller is shown in the rack, a data controller may be located in any suitable location.

In some embodiments, backplanes are mounted to reduce or minimize transmission of shock and/or vibration loads between each module of a hard disk drive system and a chassis and between drive modules (for example, mechanical modules and drive control modules). In certain embodiments, pads are provided on rails on the bottom of a data storage module chassis. A backplane circuit board assemblies may be mounted on pads. The pads may be made of a shock absorbing material, such as an elastomeric material. Pads may reduce transmission of shock and/or vibration between a data storage module chassis and modules of hard disk drive systems.

In some embodiments, elements of disk drive backplanes and a chassis may combine to form a box section mounting for hard disk drives. For example, a chassis bottom panel, rails, and one or more backplane circuit board assemblies may combine to form a rectangular box section. The box section may reduce deformation of a chassis, such as sagging of a chassis bottom panel, which might occur if hard disk drives were installed directly on a bottom panel of a data storage module chassis. In some embodiments, rails, pads, a tray, or similar structural elements may serve multiple functions, including forming the box section structure, space for cable runs, and space for air flow.

Figure 13:
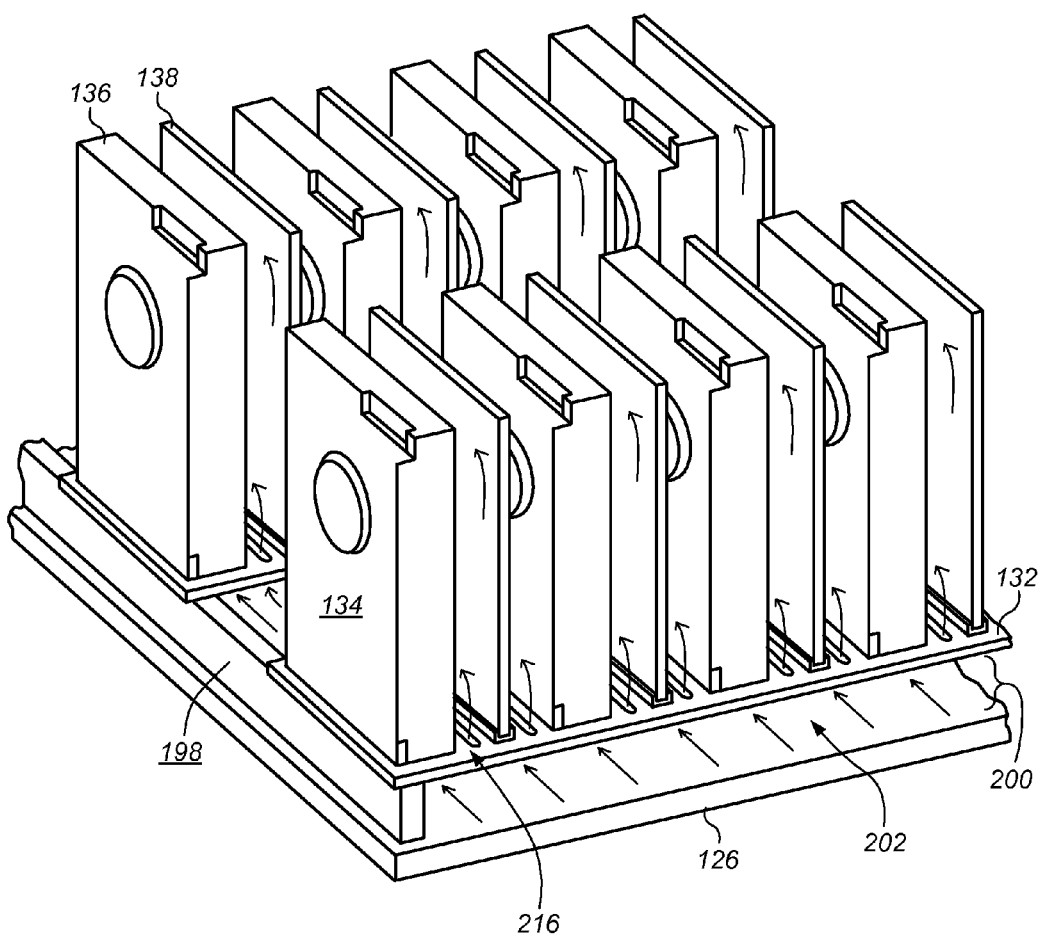
FIG. 13 illustrates one embodiment of venting of airflow from under mass storage device backplanes.

In some embodiments, a system includes an air passage under two or more mass storage device backplanes. FIG. 13 illustrates a data storage module that includes risers. Mechanical modules 136 and drive control modules 138 of hard disk drive systems 134 may be mounted on backplane circuit board 132. Risers 198 may space backplane circuit boards 132 from the floor of chassis to form gap 200. Gap 200 may define air passage 202 under backplane circuit board assemblies 132. Air passage 202 may extend continuously from the foremost backplane circuit boards 108 to the rearmost of backplane circuit board assemblies 132.

As shown in FIG. 11, air may flow in through front vents 204 in the front of data storage module chassis 126. In the embodiments shown in FIG. 11, front vents 204 are located near the bottom of data storage module chassis 204. Front vents may, however, be in any location on the front of a chassis or enclosure. Air may be moved from front to rear of data storage module chassis 126 by one or more air moving devices. The air moving devices may be located external to data storage module chassis 126, in or on data storage module chassis 126, or both. Air may flow through air passage 202 under backplane circuit board assemblies 132 and exit through the rear of data storage module chassis 126.

Still referring to FIG. 11, data storage module 122 may include power supply inlet plenum 208 and power supply exit plenum 210. Some of the air at the front of data storage module chassis 126 may pass into power supply inlet plenum 208 through power supply front inlet 212 and into a housing for power supply unit 130. Air flowing through the power supply housing may exit the housing and pass into power supply exit plenum 210. In certain embodiments, air may be ducted to the bottom of the chassis (for example, under backplane circuit boards 132.

In some embodiments, air from power supply exit plenum may mix with air coming into data storage module chassis 126 before passing under backplane circuit boards 132. In certain embodiments, exhaust air from power supply unit 144 may be segregated from other air entering data storage module chassis 130, for example, by a duct that carries the exhaust air from the power supply unit to the rear of data storage module chassis 126.

In certain embodiments, a power supply is oriented in a module such that the exhaust air from the module is directed under mass storage backplanes in a chassis. For example, power supply unit 130 shown in FIG. 11 may be rotated 90 degrees counterclockwise such that air flowing through the power supply unit exits the power supply unit near the bottom of the chassis.

In some embodiments, air flowing under mass storage device backplanes may be vented upwardly so as to remove heat from the mass storage devices. For example, as shown in FIG. 13, air flow may be vented from under mass storage device backplanes. Air may flow under backplane circuit board assemblies 132 in air passage 202 between the backplanes and the bottom of data storage module chassis 126. At each of backplane circuit boards 132, some of the air flowing from the front to the rear of the chassis may be vented through openings 216 in backplanes circuit board assemblies 132 between adjacent drive mechanical modules 136 and drive control modules 138. Air may rise through openings 216 upwardly across the surfaces of mechanical modules 136 and drive control modules 138. Some of the air may reach the top of the chassis. The air passing upwardly over drive mechanical modules 136 and drive control modules 138 may remove heat from drive mechanical modules 136 and drive control modules 138. Air passing upwardly across drive mechanical modules 136 and drive control modules 138 may move toward the rear of data storage chassis 126.

In some embodiments, the size and number of opening in a backplane may be selected to tune the air flow through various hard disk drives in a chassis. For example, in one embodiment, the vents for the backplanes near the rear of the chassis may larger than the vents for the backplanes near the front of the chassis, since a greater airflow may be required near the rear of the chassis because of the relatively warm air in that portion of the chassis. In some embodiments, air flow may be tuned to improve cooling of drive control modules and mechanical modules. For example, the holes in backplane circuit boards 132 may be sized or positioned to increase airflow over heat producing components on drive control modules 138.

Figure 14:
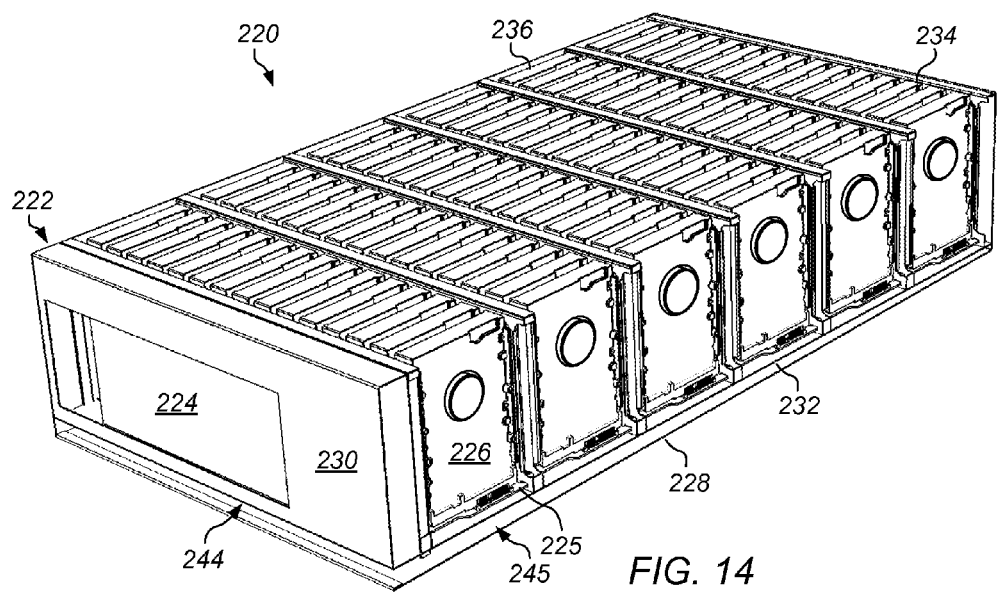
FIG. 14 illustrates one embodiment of a data storage module including a shelf and cross braces for drive mechanical modules with drive mechanical modules installed on the shelf.

FIG. 14 illustrates one embodiment of a data storage module including a shelf and cross braces for drive mechanical modules with drive mechanical modules installed on the shelf. Data storage module 220 includes chassis assembly 222, power supply unit 224, backplane circuit board assemblies 225, and drive mechanical modules 226. Each of backplane circuit board assemblies 225 may include control circuits for controlling mechanical operations drive mechanical modules 226 on and access of data for all of the mechanical drive modules 226 mounted on the backplane circuit board assembly. In one embodiment, each of backplane circuit board assemblies 225 includes control elements described above relative to FIG. 4.

Chassis assembly 222 includes base panel 228, front housing 230, shelf 232, cross braces 234, and left side panel 236. Chassis assembly 222 may also include a right side panel (a right-side panel has been omitted from FIG. 14 for illustrative purposes).

In the embodiment shown in FIG. 14, cross braces 234 are provided between each of backplane circuit board assemblies 234. In other embodiments, however, cross braces may be provided between only certain rows of hard disk drives, or omitted altogether.

In some embodiments, shelf 232 is mounted on shock absorbing elements. For example, an array of shock absorbing pads may be provided between shelf 232 and base panel 228.

Cross braces 234 are mounted on shelf 232. Drive mechanical modules 226 are installed on backplane circuit board assemblies 225 between cross braces 234.

In the embodiment shown in FIG. 14, power supply unit 224 is mounted such that its length runs transversely relative to the front of the chassis (for example, lengthwise left to right). Opening 244 is provided at the front of chassis assembly 222. Opening 244 may allow air at the front of data storage module 220 to pass into air passage 245 formed between base panel 228 and shelf 232. Air passage 245 may run the length of data storage module 220 from front to back. Air passage 245 may supply air for removing heat from drive mechanical modules 226.

Figure 15:
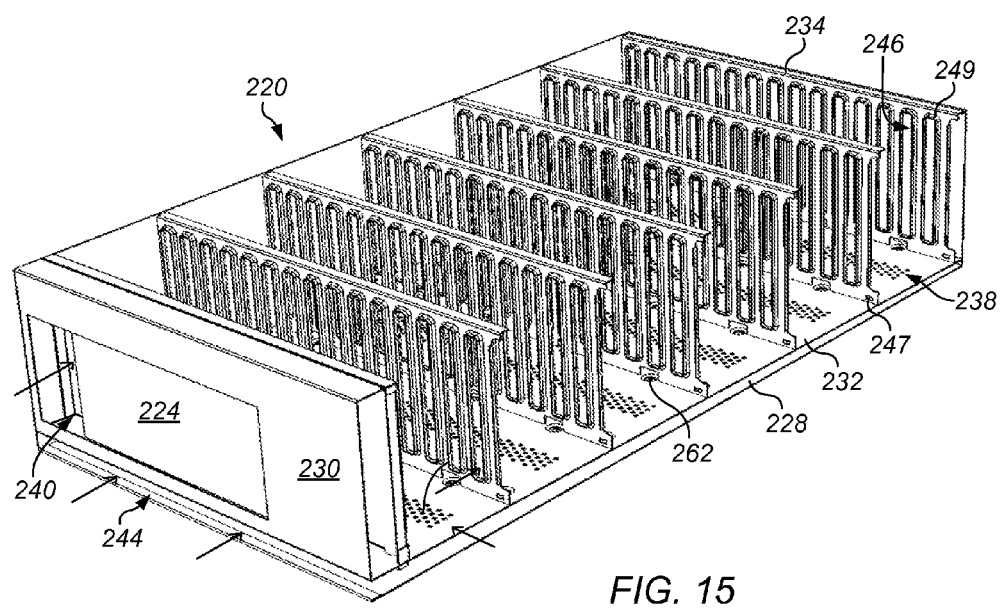
FIG. 15 illustrates one embodiment of a data storage module including a shelf and cross braces drive mechanical modules with drive mechanical modules removed.

FIG. 15 illustrates one embodiment of a data storage module including a shelf and cross braces for drive mechanical modules with the drive mechanical modules removed for illustrative purposes. In addition, rear-facing members of the cross braces have been omitted for clarity. In some embodiments, rear-facing cross brace members are identical to the front-facing cross brace members.

Cross braces 234 include guide rims 249. Guide rims 249 include openings 246. Cross braces 234 may stiffen chassis assembly 222 and inhibit sagging of chassis elements under the weight of drive mechanical modules 226. Guide rims 249 may serve as guides for drive mechanical modules 226. Openings 246 may provide a path for front-to-back air flow through cross braces 234 between adjacent drive mechanical modules 226.

Figure 16:
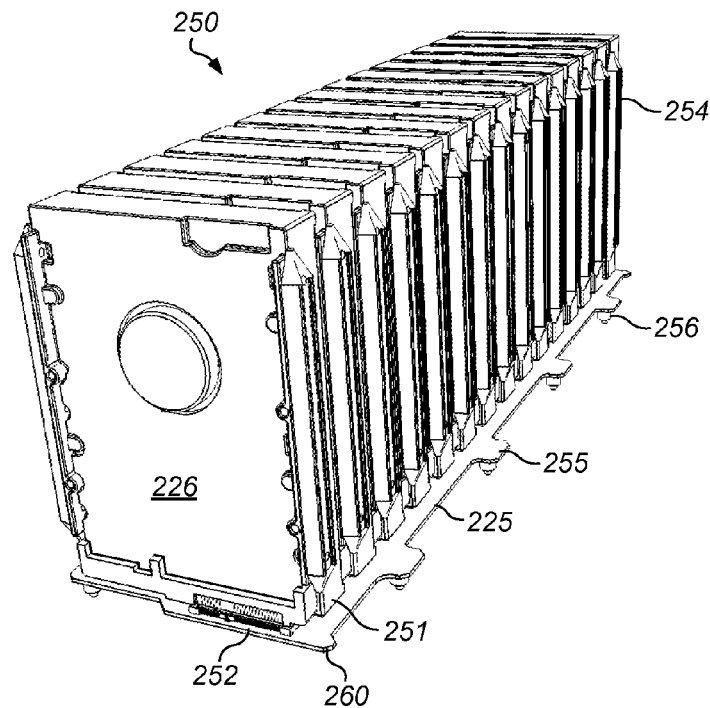
FIG. 16 is a top perspective view of one embodiment of a hard disk drive assembly including a backplane circuit board.
Figure 17:
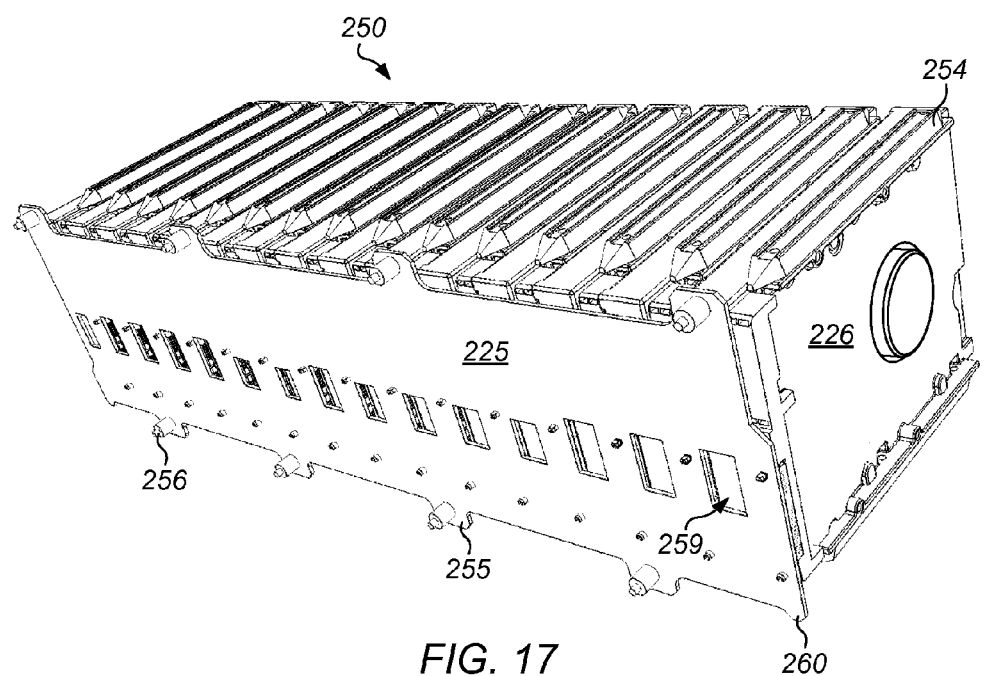
FIG. 17 is a bottom perspective view of one embodiment of a hard disk drive assembly including a backplane circuit board.

FIG. 16 is a top perspective view of one embodiment of a disk storage assembly including a backplane circuit board. FIG. 17 is a bottom perspective view of one embodiment of a disk storage assembly including a backplane circuit board. Disk storage assembly 250 includes drive mechanical modules 226 and backplane circuit board assembly 225. Drive mechanical modules 226 may mount on backplane circuit board assembly 225 at base 251. Connectors 252 may electrically couple drive mechanical modules 226 to backplane circuit board assembly 225.

Each of drive mechanical modules 226 may be provided with a pair of opposing rails 254. In some embodiments, rails 254 may serve as a handle for drive mechanical modules 226.

Backplane circuit board assembly 225 may include tabs 255 and mounting pads 256. In some embodiments, mounting pads 256 are made of a shock-absorbing material. In certain embodiments, mounting pads 256 include threads (for example, for installing a backplane on a chassis). Tabs 260 may engage in slot 247 on cross brace 234.

Referring again to FIG. 15, during operation, air at the front of data storage module 250 may flow into power supply opening 240 and opening 244. Air entering through power supply opening 240 may pass through an enclosure for power supply unit 224. The air may exit the power supply enclosure through vent 242. Air exhausted from vent 242 of power supply unit 224 may mix with air entering chassis assembly 224 through opening 244. The mixed air may continue through air passage 245. Some of the air moving from front to rear in air passage 245 may pass through shelf vents 238 in shelf 332 and through backplane openings 259 (shown in FIG. 9). Air that has been vented through shelf vents 238 may flow upwardly across drive mechanical modules 226 and rearward through openings 246 in cross braces 234, thereby removing heat from drive mechanical modules 226. Air may flow through openings 246 in cross braces 234 until it reaches the rear of chassis assembly 222.

Figure 18:
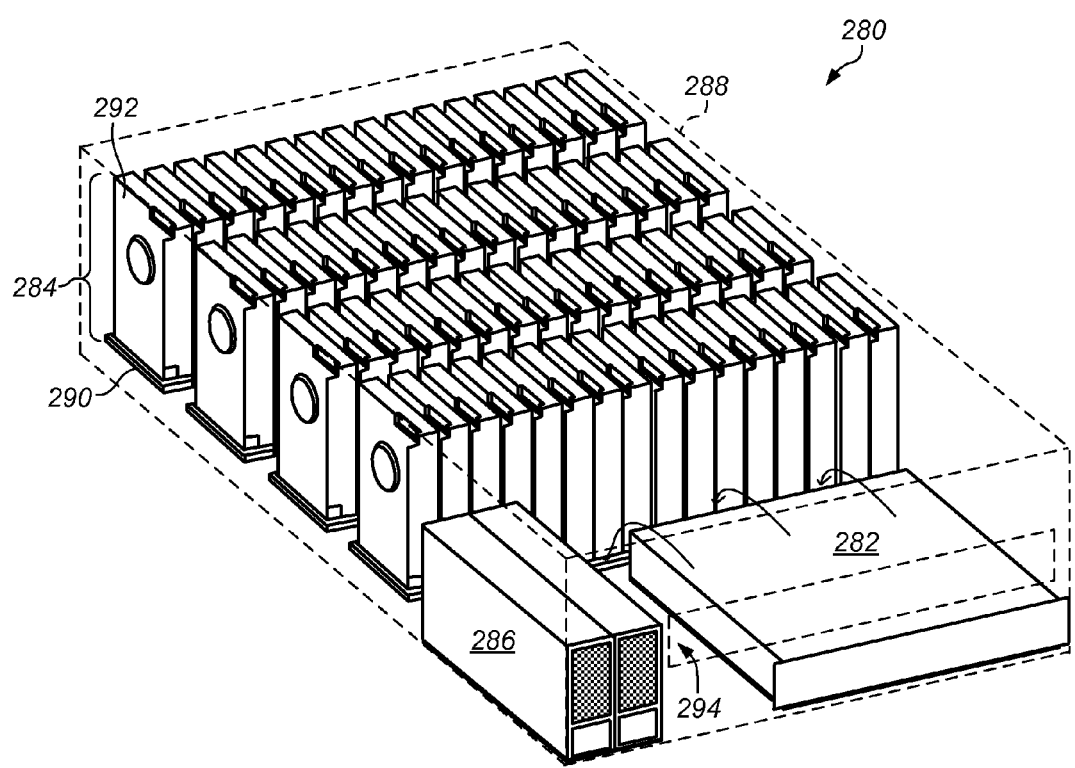
FIG. 18 illustrates one embodiment of a module that includes a data controller and multiple disk drive backplanes.

In some embodiments, a data storage module includes a data controller and two or more backplanes having multiple mass storage devices. The data controller and the backplanes may be supported on a common chassis. In some embodiments, the module includes drive mechanical modules mounted on the backplanes in a vertical orientation. FIG. 18 illustrates one embodiment of a module that includes a data controller and multiple drive mechanical module backplanes. Data storage module 280 includes controller 282, data storage assemblies 284, power supply units 286, and chassis 288. Controller 282, data storage assemblies 284, and power supply units 286 are mounted on chassis 288.

Data storage assemblies 284 include backplane circuit board assemblies 290 and hard disk drives 292. Backplane circuit board assemblies 290 may be mounted horizontally in data storage module chassis 288. Drive mechanical modules 292 are installed on backplane circuit board assemblies 290. Drive mechanical modules 292 are installed in a vertical orientation, similar to that described above relative to FIG. 2. Each of backplane circuit board assemblies may carry, and provide electrical connections for, multiple drive mechanical modules 292.

Power supply units 286 may be coupled to backplane circuit board assemblies 290. Power supply units 286 may supply power to backplane circuit board assemblies 290 and drive mechanical modules 292.

In some embodiments, air flows from front to rear in a module such that air downstream from a controller or motherboard assembly flows under two or more mass data storage backplanes. For example, as shown by the arrows in FIG. 18, air may pass into front vents 294 of chassis 288 and over controller 282. Air downstream from controller 282 may flow under backplane circuit board assemblies 290. In some embodiments, air exhausted from power supply units 286 mixes with air downstream from controller 282 before passing under backplane circuit board assemblies 290.

Figure 19:
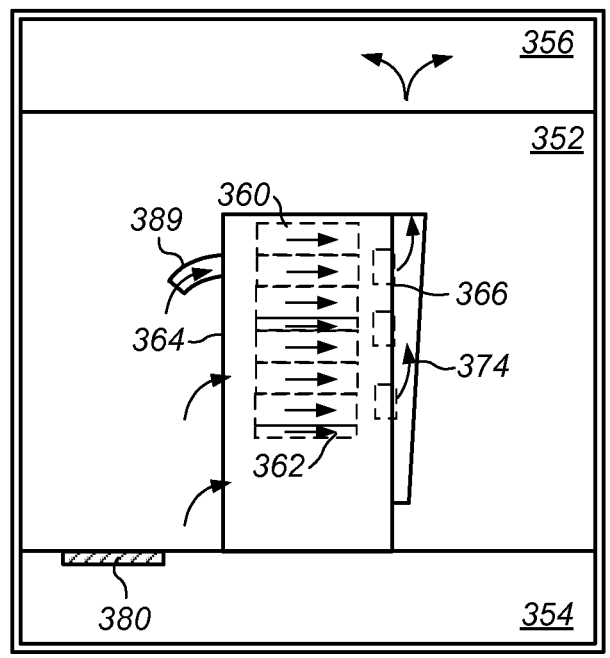
FIG. 19 illustrates one embodiment of removal of heat from data storage modules in a rack system.

FIG. 19 illustrates one embodiment of removal of heat from data storage modules in a rack system. Air may pass into computing room 352 from sub-floor plenum 354 by way of vent 380. Rear fans 366 in fan door 374 may draw air from front aisle 368 into rack 364, and through data storage modules 360 and data control modules 362. Rear fans 366 may exhaust heated air out of the rack. The heated air may pass into ceiling plenum 356. Air directing device 389 is provided on the front or rack. Air directing device 389 may be used to promote airflow in particular modules mounted in the rack. Other arrangements of air movers may be included in various embodiments. U.S. patent application Ser. No. 12/646,417, "Air Directing Device for Rack System", filed Dec. 23, 2009; U.S. patent Ser. No. 12/751,212, "Rack-Mounted Air Directing Device with Scoop", filed Mar. 30, 2010; and U.S. patent application Ser. No. 12/886,440, "System with Rack-Mounted AC Fans", filed Sep. 9, 2010, each of which is incorporated by reference as if fully set forth herein, include other arrangements, systems, devices, and techniques that may be used in various embodiments for cooling or mounting computing modules, data storage modules and data control modules.

Figure 20:
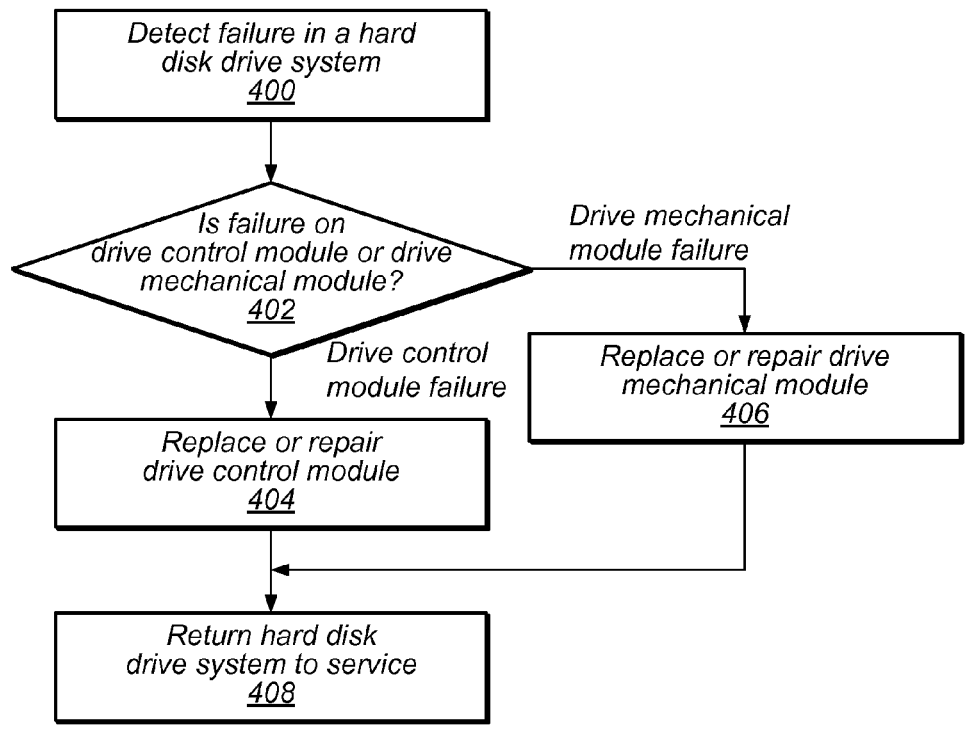
FIG. 20 illustrates maintaining a data storage drive system by isolating failures between a drive control module and a mechanical module of a hard disk drive system.

In an embodiment, maintaining a data storage system includes replacing or repairing modules of hard disk drives. FIG. 20 illustrates maintaining a data storage drive system by isolating failures between a drive control module and a mechanical module of a hard disk drive system. At 400, failure of a hard disk drive system in a data storage system is detected. In some embodiments, a failure is detected automatically, for example, during a self-diagnostic test of the data storage system. In some embodiments, a failure is indicated by a loss of communication with the drive system.

At 402, the failure in the hard disk drive system is isolated to either a drive control module or a drive mechanical module. Isolation to a particular module of a hard disk drive system may be accomplished automatically, manually, or a combination of both. In some cases, isolation may be to a particular component of a hard disk drive system (for example, a spindle motor of a mechanical module, or a microprocessor on a drive control circuit board).

If the failure is in a drive mechanical module, the drive mechanical module of the hard disk drive system may be replaced or repaired without removing the drive mechanical module of the hard disk drive system from the data storage system at 404. If the failure is in a drive control module, the drive control module of the hard disk drive system may be replaced or repaired without removing the hard disk drive mechanical module of the hard disk drive system from the data storage system at 406. In some embodiments, a tray or chassis is withdrawn from an installed position in the rack to access the failed module for removal or repair.

At 408, the hard disk drive system is returned to service. If the maintenance action involved replacing a drive mechanical module, data may be restored from backup storage (for example, a backup storage device external to the data storage system.

Although methods described above relative to FIG. 20 include fault detection and isolation to a mechanical module or a drive control module, maintenance of a data storage system may, in some embodiments, be performed without fault detection or isolation to a mechanical module or a drive control module. For example, a mechanical module or a drive control module may be removed and replaced based on a maintenance protocol, without any testing to isolate a fault condition to the drive control module. In certain embodiments, a mechanical module or drive control module may be removed and replaced as part of periodic maintenance. In one embodiment, a drive control module is removed and replaced when a hard disk drive system does not respond to signals from a control module.

Figure 21:
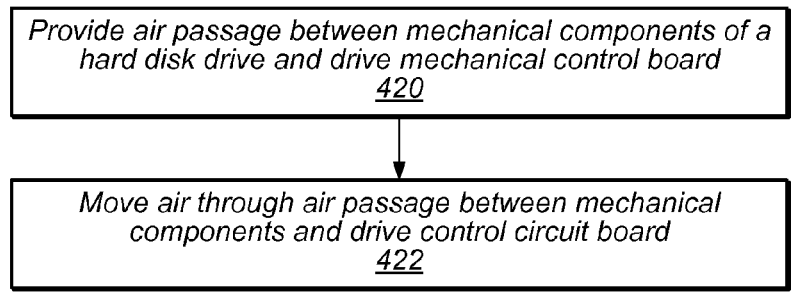
FIG. 21 illustrates an embodiment of cooling a hard disk drive system.

In some embodiments, cooling a hard disk drive system includes moving air between a mechanical module and a mechanical control circuit board for the hard disk drive system. FIG. 21 illustrates an embodiment of cooling a hard disk drive system. At 500, an air passage is provided between mechanical components of a hard disk drive and a drive control circuit board that controls mechanical operations of the hard disk drive. In some embodiments, the mechanical components of are provided within a sealed enclosure. In some embodiments, an air passage is established by including spacer elements between a case for the mechanical components of the hard disk drive system and the drive control circuit board.

At 422, air is moved through the air passage to remove heat from heat producing components on the drive control circuit board. In some embodiments, heat from the mechanical components is rejected into air moving through the air passage. Air flow may be provided by an air moving device on the hard drive system, such as a fan, a bulk air handling system, or rack-level air moving devices.

Figure 22:
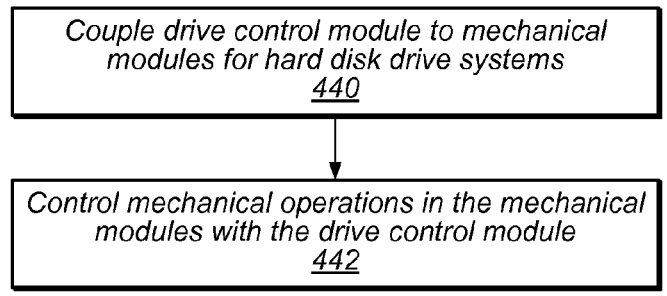
FIG. 22 illustrates one embodiment of providing data storage with a drive control module controlling mechanical modules in multiple hard disk drive systems.

In an embodiment, providing data storage includes controlling mechanical operations in mechanical modules of two or more hard disk drive systems from a common drive control module. FIG. 22 illustrates one embodiment of providing data storage with a drive control module controlling mechanical modules in multiple hard disk drive systems. At 440, a drive control module is coupled to a mechanical module for each of two or more hard disk drive systems.

At 442, mechanical operations in at least one of the mechanical modules are controlled with the drive control module. In one embodiment, spindle motors and actuator assemblies of the mechanical modules are controlled from the drive control module. In some embodiments, the drive control module selects one or more of the mechanical modules to control, while other ones of the mechanical modules coupled to the drive control module are idle. For example, in data storage system 80 shown in FIG. 6, drive data control module 82 may control mechanical operations in drive mechanical module 1, while drive mechanical module 2 is idle. In certain embodiments, a drive control module simultaneously controls mechanical operations in two or more of the drive mechanical modules with the drive control module.

In some embodiments, a drive control module is oversubscribed such that the drive control module can only control some of the drive mechanical modules to which it is connected at any given time. For example, in data storage system 80 shown in FIG. 6, drive data control module 82 may only be able to control some of drive mechanical modules 81 at any given time. The drive control module may switch control between the mechanical modules to selectively control different ones of the drive mechanical modules.

In certain embodiments, a computing module includes mass storage device modules that are mounted in two or more different orientations. In one embodiment, a computing unit includes one or more drive mechanical modules and drive control modules mounted in a horizontal orientation and one or more drive mechanical modules and drive control modules mounted in a vertical orientation. Examples of suitable hard disk drive form factors may include 3.5", 5.25", and 2.5".

In some embodiments, rack-mounted computing devices are commonly cooled by a cooling air system that delivers air to the rack. To remove heat from computing devices installed in the rack, an air handling system may be operated to cause air to flow in computer room and through the rack system. As the air reaches the front of each of computing devices, the air may pass through the chassis of the computing devices. After passing through the chassis, the heated air may exit the rear of the rack system and flow out of the computer room. In certain embodiments, computing devices may have on board fans in addition to, or lieu of, a central cooling system. In certain embodiments, a rack may have a fan that supplies cooling air to all of the computing devices in the rack.

Although in the embodiments described above, drive mechanical modules and drive control modules are mounted on pads and rails, in various embodiments, drive mechanical modules and drive control modules or other data storage devices may be mounted to a chassis using other mounting elements. For example, drive mechanical modules and drive control modules and/or backplanes for the drive mechanical modules and drive control modules may be mounted on square tubes that support the modules and raise the modules above the bottom of a chassis.

In some embodiments, a rack system includes rack-mounted fans external to computer systems in the rack. The rack-mounted fans may provide air flow through the computer systems.

For clarity, modules in many of the figures herein have been shown with a simple box outline around functional components. In various embodiments, a module or a chassis for a module may include an enclosure, a tray, a mounting plate, a combination thereof, as well as various other structural elements. Modules may in various embodiments be 3 U, 4 U, 6 U or any other height or dimensions.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for storing data, comprising:
   two or more drive mechanical modules configured to store data; and
   a drive control module coupled to the two or more drive mechanical modules, wherein the drive control modules is configured to control at least one mechanical operation in at least two of the drive mechanical modules, wherein the drive control module is oversubscribed such that the drive control module is configurable to control mechanical operations in only part of the two or more drive mechanical modules at any given time.

2. The system of claim 1, wherein the drive control module is configured to select one of the drive mechanical modules and control the selected one of the drive mechanical modules.

3. The system of claim 1, wherein the drive control module comprises one or more circuits configured to switch control among at least two of the selected one of the drive mechanical modules.

4. The system of claim 1, wherein the drive control module is configured to control two or more of the drive mechanical modules at a time.

5. The system of claim 1, wherein the drive control module is configured to access data on at least one of the drive mechanical modules.

6. The system of claim 1, wherein the drive control module is oversubscribed such that the drive control module is configurable to access data on only part of the two or more drive mechanical modules at any given time.

7. A system for storing data, comprising:
   two or more drive mechanical modules configured to store data;
   one or more drive control modules, physically separate from the two or more drive mechanical modules and coupled to the two or more drive mechanical modules, wherein at least one of the one or more drive control modules is configured to control at least one mechanical operation in at least two of the two or more drive mechanical modules which are physically separate from the one or more drive control modules; and
   one or more data control modules, each of at least one of the data control modules is separate from the one or more drive control modules and is configured to control the one or more drive control modules and access data on at least two of the drive mechanical modules.

8. The system of claim 7, wherein at least one of the drive control modules is configured to select one of the drive mechanical modules and control the selected one of the drive mechanical modules.

9. The system of claim 7, wherein at least one of the drive control modules comprises one or more circuits configured to switch control among at least two of the selected one of the drive mechanical modules.

10. The system of claim 7, wherein at least one of the drive control modules is configured to control two or more of the drive mechanical modules at a time.

11. The system of claim 7, wherein at least one of the drive control modules is oversubscribed such that the drive control module is configurable to control only part of the two or more drive mechanical modules at any given time.

12. The system of claim 7, wherein at least one of the data control modules is configured to access data on a selected one of the mechanical modules.

13. The system of claim 7, wherein at least one of the data control modules is oversubscribed such that the data control module is configurable to access data on only part of the two or more drive mechanical modules at any given time.

14. The system of claim 7, wherein at least one of the drive control modules is configured to access data on at least one of the drive mechanical modules.

15. The system of claim 7, wherein at least one of the one or more drive mechanical modules is field-replaceable without removing the drive control module from the system.

16. The system of claim 7, wherein the drive control module is field-replaceable without removing the two or more drive mechanical modules from the system.

17. A method of providing data storage, comprising:
coupling a drive control module to two or more mechanical modules of two or more hard disk drive systems, such that the drive control module is physically separate from the two or more mechanical modules;
controlling at least one mechanical operation in at least two of the mechanical modules with the drive control module; and
accessing data on at least two of the drive mechanical modules with a data control module that is physically separate from the drive control module.

18. The method of claim 17, wherein controlling at least one mechanical operation in at least two of the mechanical modules with the drive control module comprises:
selecting one of the mechanical modules; and
controlling at least one mechanical operation in the selected one of the mechanical modules with the drive control module.

19. The method of claim 17, wherein coupling a drive control module to two or more mechanical modules of one hard disk drives comprises coupling the drive control module to more mechanical modules than the drive control module can control at a given time such that the drive control module is oversubscribed and configured to control only part of the two or more drive mechanical modules at any given time, the method further comprising switching control of at least one mechanical operation from one of the mechanical modules to at least one other of the mechanical modules.

20. The method of claim 17, wherein controlling at least one mechanical operation in at least two of the mechanical modules with the drive control module comprises simultaneously controlling mechanical operations in two or more of the mechanical modules with the drive control module.

21. The system of claim 7, wherein controlling at least one mechanical operation in a drive mechanical module comprises one or more of:
controlling operation of a spindle motor in the drive mechanical module,
controlling a physical position of an actuator assembly arm in the drive mechanical module, or
controlling a physical location of a read/write head in the drive mechanical module.

* * * * *